United States Patent
Tanimoto

(10) Patent No.: US 9,981,779 B2
(45) Date of Patent: May 29, 2018

(54) ROPE FIXTURE, BAG OPENING BINDING TOOL, AND FLEXIBLE CONTAINER BAG

(71) Applicant: GORYO TRADING CO., LTD., Higashimatsuyama-shi (JP)

(72) Inventor: Osamu Tanimoto, Higashimatsuyama (JP)

(73) Assignee: GORYO TRADING CO., LTD., Saitama (JP)

( * ) Notice: Subject to any disclaimer, the term of this patent is extended or adjusted under 35 U.S.C. 154(b) by 14 days.

(21) Appl. No.: 14/403,892

(22) PCT Filed: Jun. 17, 2014

(86) PCT No.: PCT/JP2014/066015
§ 371 (c)(1),
(2) Date: Nov. 25, 2014

(87) PCT Pub. No.: WO2015/029551
PCT Pub. Date: Mar. 5, 2015

(65) Prior Publication Data
US 2016/0264305 A1    Sep. 15, 2016

(30) Foreign Application Priority Data
Aug. 29, 2013 (JP) ................. 2013-177729

(51) Int. Cl.
*B65D 63/16* (2006.01)
*B65B 51/08* (2006.01)
(Continued)

(52) U.S. Cl.
CPC .......... *B65D 33/1633* (2013.01); *B65B 51/08* (2013.01); *B65B 67/06* (2013.01); *B65D 88/1668* (2013.01); *F16G 11/103* (2013.01)

(58) Field of Classification Search
CPC .... B65D 55/08; B65D 88/1688; B65D 63/16; B65D 63/14; B65D 33/1625; B65B 51/08;
(Continued)

(56) References Cited

U.S. PATENT DOCUMENTS 98,527 A * 1/1870 Southwick .............. F16G 11/10
24/130
5,210,911 A * 5/1993 Brown ................... B65D 63/16
24/129 B

FOREIGN PATENT DOCUMENTS

GB 975536 A * 11/1964 ............. B65D 63/16
JP 49-47570 12/1974
(Continued)

OTHER PUBLICATIONS

International Search Report issued in corresponding International Application No. PCT/JP2014/066015, dated Sep. 5, 2014, and English translation (6 pages).

*Primary Examiner* — Jack W Lavinder
(74) *Attorney, Agent, or Firm* — Buchanan Ingersoll & Rooney PC

(57) ABSTRACT

A rope fixture 11 fixes a closing rope 12 for binding a bag opening of a flexible container bag 20A as a bag body, and includes a plate-shaped body in which a through-hole and a slit are formed, wherein a through-hole 13 allows the closing rope 12 to pass therethrough and a slit 14 nips and locks the closing rope 12 and has an insertion opening 17 provided at one end located at a lateral side of the plate-shaped body 15 and has a rope locking portion 18 allowing the closing rope 12 to pass therethrough and locks the closing rope 12 provided at the other end.

14 Claims, 13 Drawing Sheets

(51) Int. Cl.
*B65D 33/16* (2006.01)
*B65B 67/06* (2006.01)
*B65D 88/16* (2006.01)
*F16G 11/10* (2006.01)

(58) Field of Classification Search
CPC . B65B 51/04; B65B 67/06; B65B 2067/1283; Y10T 24/1404; Y10T 24/3918; Y10T 24/3916; Y10T 24/3924; Y10T 24/44274; Y10T 24/44923; Y10T 24/155; Y10T 24/3716; Y10T 24/3724; A43C 7/04
See application file for complete search history.

(56) References Cited

FOREIGN PATENT DOCUMENTS

| | | |
|---|---|---|
| JP | 52-64102 | 5/1977 |
| JP | 54-44254 | 3/1979 |
| JP | 54-150767 | 10/1979 |
| JP | 63-153812 | 10/1988 |
| JP | 10-291548 | 11/1998 |
| JP | 2013-070671 | 4/2013 |
| WO | WO 2005044682 A1 * 5/2005 | ......... B65D 33/1625 |

* cited by examiner

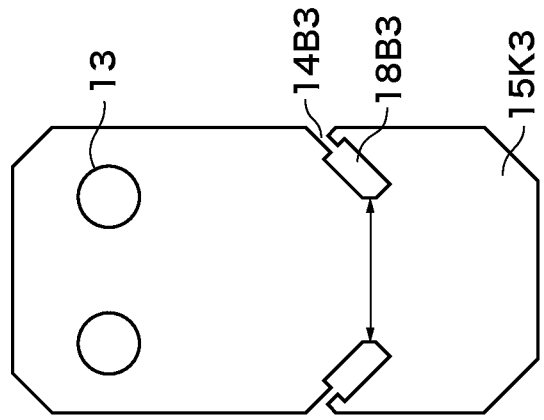
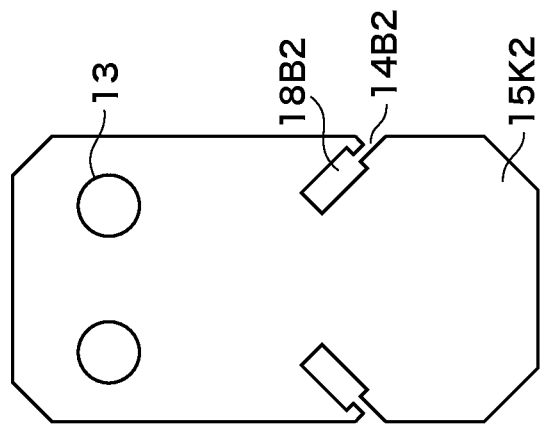
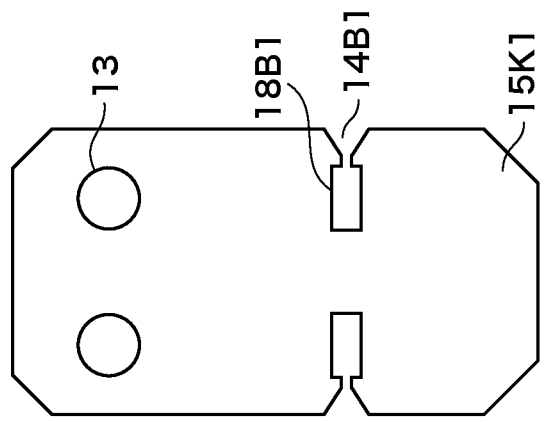

ROPE FIXTURE, BAG OPENING BINDING TOOL, AND FLEXIBLE CONTAINER BAG

TECHNICAL FIELD

The present invention relates to a rope fixture, a bag opening binding tool, and a flexible container bag. Particularly, the invention relates to a rope fixture, a bag opening binding tool, and a flexible container bag for ensuring binding of bag openings of a bag body.

BACKGROUND ART

Flexible container bags are mainly used in order to be filled with and transport individual substances (various mining-and-manufacturing feedstock, food or agricultural materials such as fertilizers). In the flexible container bags, contents (objects to be transported or stored) are charged and saved from a charging opening, and the contents are discharged from a discharge opening. Both the charging opening and the discharge opening are typically bound by closing ropes. During charging, in many cases, the charging is performed in a state where a charging opening of a flexible container bag is opened from the beginning. Therefore, inconvenience rarely occurs in the work of untying the closing rope. In contrast, during discharge in which contents are discharged in order to use the contents in factories/farms or the like, particularly in a case where the closing rope that closes the discharge opening of a lower surface of the flexible container bag is firmly tightened, there is a problem that substantial time is taken to loosen the closing rope in manual work and working efficiency drops. On the other hand, in a case where the closing rope is loosely tightened, there is a problem in that contents may leak out from the discharge opening due to factors such that the discharge opening is widened by the pressing of contents and the closing rope is easily untied. In such a case, if work is performed under the flexible container bag filled with contents in a state where the flexible container bag is hung up or in a state where the discharge opening of the flexible container bag is exposed, there is also a problem in that there is a concern about danger caused by dropping of the contents.

An example of a Highland lock (registered trademark) as a rope fixture of a conventional bag opening binding tool is illustrated in FIG. 12A and FIG. 12B. The Highland lock 40 is constituted by four components including a main body 41, a toothed stopper 42, a hollow shaft 43, and a release string 44. For example, polypropylene is used for these components. For example, a wire net braid 47 having 5 mm$\phi$ diameter is used as a string that opens and closes a drawstring bag 45. First, the wire net braid 47 is passed through a string passing-through hole 46 that allows a string formed around a bag opening of the drawstring bag 45 to pass therethrough, and two tip portions of the wire net braid 47 are taken out to the outside from the string passing-through hole 46. Next, the two tip portions of the wire net braid 47 are taken out to the outside through the main body 41. Although a cavity is formed in the main body 41, the width of the cavity is wide at an outlet and becomes narrower from the outlet toward the interior. The two tip portions of the wire net braid 47 are arranged along both side surfaces of the main body 41. Next, the toothed stopper 42 is inserted from the outlet side of the main body 41. If the toothed stopper 42 is put into the interior, the wire net braid 47 is pressed against and fixed to both internal side walls of the main body 41 by the toothed stopper 42. Next, the hollow shaft 43 is thrusted into the toothed stopper 42 from a slit 48 provided in the main body 41. Next, the release string 44 is passed through the hollow shaft 43. In this state, the wire net braid 47 is held while being fixed to the internal side walls of the main body 41. If the release string 44 is pulled in the direction of an arrow, the toothed stopper 42 can be pulled in the direction and the two tip portions of wire net braid 47 can be released from the pressing applied by the toothed stopper 42, can be separated from the internal side walls of the main body 41, and can be freely moved in a longitudinal direction of the wire net braid 47.

Another example of a rope fixture of a conventional bag opening binding tool is illustrated in FIG. 13A and FIG. 13B (refer to Patent Document 1). A Y-shaped fastener 51 is used for a portion of a pet pulling leash 50. An example in which a lead 52 that constitutes a loop at a portion serving as a collar is inserted into the Y-shaped fastener 51 from two places of a Y-shaped upper portion and two portions of the lead inserted from the two places are gathered together into one bundle at a Y-shaped lower portion is illustrated. Here, the lead 52 is fixed to the Y-shaped fastener 51 by a frictional force between the lead 52 and the Y-shaped fastener 51. Additionally, in a rope pressing supporter 55 provided at a handle portion 53, the two tips of the lead 52 are pressed against the internal side walls and fixed to the handle portion 53 by rotating a knob 54.

Additionally, as another example of the rope fixture of the conventional bag opening binding tool, a lever mechanism as seen in a buckle for a belt is used, and the closing rope is pressed and fixed by a lever having a saw-toothed projection provided at a tip thereof.

However, in such a conventional rope binding tool, since the rope is merely pressed against the side walls or the like and is fixed in one place, there is a problem in that the rope is loosened and untied after binding. Additionally, if the tips of the rope is passed through a tube or the like for a rope slider and is firmly tied during binding, there is a problem in that, when a heavy load is applied to a knot, the knot becomes tight and is difficult to be untied during releasing.

PRIOR ART DOCUMENT

Patent Document

[Patent Document 1]
JP-A-2013-70671

DISCLOSURE OF INVENTION

Problem to be Solved by the Invention

An object of the invention is to ensure the binding of a bag body when bag openings of the bag body are closed (bring about a state where untying does not occur easily during the storage or movement of a flexible container bag) and to facilitate the releasing work of a closing rope that has bound the bag openings in the discharge work of contents (enhance working efficiency).

Means for Solving the Problem

In order to solve the above subject, a rope fixture 11 related to a first aspect of the invention, for example as illustrated in FIG. 1, is a rope fixture 11 that fixes a closing rope 12 for binding a bag opening of a flexible container bag 20A (refer to FIG. 2A to FIG. 2D) as a bag body, comprises a plate-shaped body in which a through-hole and a slit are formed, wherein a through-holes 13 allow the closing rope 12 to pass therethrough, a slit 14 nips and locks the closing rope 12 and has an insertion opening 17 provided at one end located at a lateral side of the plate-shaped body 15 and to have a rope locking portion 18 allowing the closing rope 12 to pass therethrough and locks the closing rope 12 provided at an other end.

Here, the bag body typically means a bag body of a flexible container bag. The bag opening typically means a discharge opening 35B (refer to FIG. 2A to FIG. 2D) and a charging opening 35A (refer to FIG. 2A to FIG. 2D). As for the charging opening 35A, when contents are filled, the contents are filled in a state where the charging opening is opened from the beginning and the closing rope 12 does not need to be untied in many cases. Therefore, it is rare that "binding strength/tightness" or "ease of untying" poses a problem. In contrast, as for the discharge opening 35B, since the "binding strength/tightness" or the "ease of untying" poses a problem, the rope fixture 11 can be used mainly for the discharge opening 35B. Additionally, it is also possible to use the rope fixture 11 for the charging opening 35A. In the flexible container bag, there is a case where heavy matter is filled. In a case where the heavy matter has leaked out as the closing rope 12 is loosened or untied, there is a concern that this leak-out leads to an accident. Thus, it is required to precisely fasten the bag opening so that the bag opening is not loosened or the closing rope 12 is not loosened or untied. Additionally, if two tip portions of the closing rope 12 are pulled in directions of insertion openings 17 of respective slits, tip portions of the closing rope 12 can be easily released from rope locking portions 18 of the slits 14.

Additionally, the plate-shaped body 15 is typically made of a plastic, metal, or rubber composition. Here, the metal includes an alloy, and the plastic includes a mixed composition. From a viewpoint of strength against an external force, the plate-shaped body is preferably made of plastic or metal. Additionally, since the plate-shaped body is easily manufactured if the plate-shaped body has uniform composition, it is preferable to have uniform composition. The plate-shaped body 15 only has to be plate-shaped as viewed on the whole even if there is thickness unevenness or roughness or irregularities of a surface.

With the configuration of this aspect, the binding of a bag body 20 can be ensured when the bag opening of the bag body is closed, and the releasing work of the closing rope 12 that has bound the bag opening can be facilitated in the discharge work of contents.

In the rope fixture 11 related to a second aspect of the invention based on the first aspect, for example as illustrated in FIG. 1, the dimensions of the through-hole 13 and the dimensions of the rope locking portion 14 are determined so that the closing rope 12 can be locked.

Here, the expression "are determined so that the closing rope can be locked" means that, although the closing rope 12 is passed through a through-hole 13 and a rope locking portion 14 if the closing rope 12 is pulled or pushed through the plate-shaped body 15, the relative positions between the closing rope 12 and the through-hole 13 or between the closing rope 12 and the rope locking portion 14 do not change in a state where the closing rope is not pulled or pushed through. That is, it is good if the closing rope can be naturally passed through the through-hole and the rope locking portion by being pulled by hand when being passed through the through-hole or the rope locking portion, and the closing rope only does not loosen when being used. For example, in a case where the through-hole 13 or the rope locking portion 14 is circular, the diameter of the through-hole 13 and the diameter of the rope locking portion 14 are made small to such a degree that there is no hindrance in passing the closing rope through the through-hole or the rope locking portion taking the deformability of the closing rope 12 into consideration. If the diameter of the through-hole 13 is equal to or slightly greater than the diameter of the closing rope 12, a locking force generated by friction works. Additionally, if the diameter of the slit locking portion 18 is slightly smaller than the diameter of the closing rope 12, the closing rope 12 is compressed and a locking effect is increased. Here, a value measured in a natural state where no force is applied is used as the diameter of the closing rope 12.

In the rope fixture 11 related to a third aspect of the invention based on the first aspect or the second aspect, for example as illustrated in FIG. 1, the number of the through-holes 13 is one or two and the number of the slits 14 are two.

With the configuration of this aspect, it is sufficient if the number of the through-holes 13 and the number of the slits 14 is one or two because the tip portions of the closing rope 12 have to be passed through a through-hole and a slit are only two. However, if the number of the through-holes and the number of the slits are three or more, these are also favorable because the through-holes and/or the slits become selectable. In a case where one through-hole is provided, the closing rope can be passed through or removed from the through-hole at once. In contrast, in a case where two through-holes are provided, portions where the closing rope 12 comes in contact with the through-holes 13 increase, and a frictional force becomes large. As a result, the closing rope is strongly locked. Additionally, in a case where one slit is provided, the closing rope can be passed through or removed from the slit at once. In contrast, in a case where two slits are provided, portions where the closing rope 12 comes in contact with the rope locking portions 14 increase, and a frictional force becomes large. As a result, the closing rope is strongly locked. Additionally, since it is necessary to remove the closing rope 12 from two slits to remove the closing rope from the rope locking portions 14, the closing rope does not come off easily, which is preferable.

In the rope fixture 11 related to a forth aspect of the invention based on the third aspect, for example as illustrated in FIG. 1, insertion openings of the two slits 14 are respectively provided at two opposed laterals-sides of the plate-shaped body 15.

With the configuration of this aspect, forces applied to two tip portions of the closing rope 12 are simultaneously directed in the same direction in many cases (also including a case where the two tip portions are bundled and pulled by hand). Thus, in such a case, even if a force is applied in any direction within a plate surface, at least one of the two tip portions does not move, and the movement of the other tip portion is inhibited. Thus, the closing rope 12 does not extremely easily come off from the rope fixture 11, which is greatly preferable.

In the rope fixture 11 related to a fifth aspect of the invention based on the third aspect, for example as illustrated in FIG. 1, a linear groove 16 is formed at a position on a surface of the plate-shaped body 15 where the linear groove 16 does not overlap with the through-hole 13 and the slit 14 and the plate-shaped body 15 is bendable in the shape of a hinge with the groove 16 as an axis.

With the configuration of this aspect, since the hinge is provided, when a force for flexing the plate-shaped body 15 is applied (when forces are applied in opposite directions at both ends to the force applied to the center of the plate-shaped body 15), the portion of the groove 16 that constitutes the hinge is bent. As a result, the force applied to the plate-shaped body 15 can be released, and the fracture resistance of the plate-shaped body can be improved.

In the rope fixture 11 related to a sixth aspect of the invention based on any one of the first aspect to the fifth aspect, the material of the plate-shaped body 15 is plastic or metal.

Here, the metal includes an alloy, and the plastic includes a mixed composition. With the configuration of this aspect, the rope fixture 11 can be made strong against pressing or flexing using the fracture resistance and elasticity of the plastic or metal. Additionally, manufacture becomes easy if the rope fixture 11 is integrally formed of the plastic or metal. Polypropylene, polyethylene, vinyl chloride, or the like, or resin materials obtained by mixing these are suitable as the plastic. Aluminum, stainless steel, or the like is suitable as the metal. Both the metal and the plastic have high shock resistance and excellent molding processability. Moreover, if the metal and the plastic are compared with each other although the fracture resistances of both are large against pressing or a flexing force, the metal has a feature that the metal is not easily deformed against pressing or a flexing force, whereas the plastic has a feature that, although the plastic is deformed by pressing or a flexing force, the plastic is restored to its original shape when the pressing or the flexing force is removed.

In the rope fixture 11 related to a seventh aspect of the invention based on any one of the first aspect to the sixth aspect, for example as illustrated in FIG. 1, the plate-shaped body 15 is of a circular shape, an elliptical shape, a triangular shape, a quadrangular shape, a polygonal shape having corners equal to or more than a pentagonal shape, or a combined shape of these shapes.

Here, the elliptical shape includes an oval shape (obtained by coupling semicircles to two opposed sides of a rectangle). With the configuration of this aspect, the plate-shaped body 15 is easily handled and easily manufactured. Additionally, the plate-shaped body is not limited to these shapes, and arbitrary shapes are possible.

A bag opening binding tool 10 related to an eighth aspect of the invention, for example as illustrated in FIG. 1, comprises the rope fixture 11 according to any one of the first aspect to the seventh aspect and the closing rope 12, and the dimensions of the through-hole 13 and the dimensions of the rope locking portion 14 are determined so that the closing rope 12 can be locked.

With the configuration of this aspect, a bag opening binding tool 10 formed by the combination of the rope fixture 11 and the closing rope 12, which can ensure the binding of the bag body when the bag opening of the bag body is closed, and can facilitate the releasing work of the closing rope 12 that has bound the bag opening in the discharge work of contents, can be provided.

A flexible container bag 20 related to a ninth aspect of the invention comprises the bag opening binding tool 10 according to the eighth aspect and a bag body that saves contents.

Here, although the bag body typically means a bag body of a flexible container bag, the bag body only has to be a bag body that can save contents and bind and close the bag opening with the closing rope. With the configuration of this aspect, a flexible container bag that can ensure the binding of the bag body when the bag opening of the bag body is closed, and can facilitate the releasing work of the closing rope that has bound the bag opening in the discharge work of contents, can be provided.

Effect of the Invention

According to the invention, the binding of the bag body can be ensured when the bag opening of the bag body is closed, and the releasing work of the closing rope that has bound the bag opening can be facilitated in the discharge work of contents.

BRIEF DESCRIPTION OF DRAWINGS

FIG. 9A is a drawing illustrating first example of rope fixtures of bag opening binding tools in Embodiment 4.

FIG. 9B is a drawing illustrating second example of rope fixtures of bag opening binding tools in Embodiment 4.

FIG. 9C is a drawing illustrating third example of rope fixtures of bag opening binding tools in Embodiment 4.

BEST MODE FOR CARRYING OUT THE INVENTION

Figure 1:
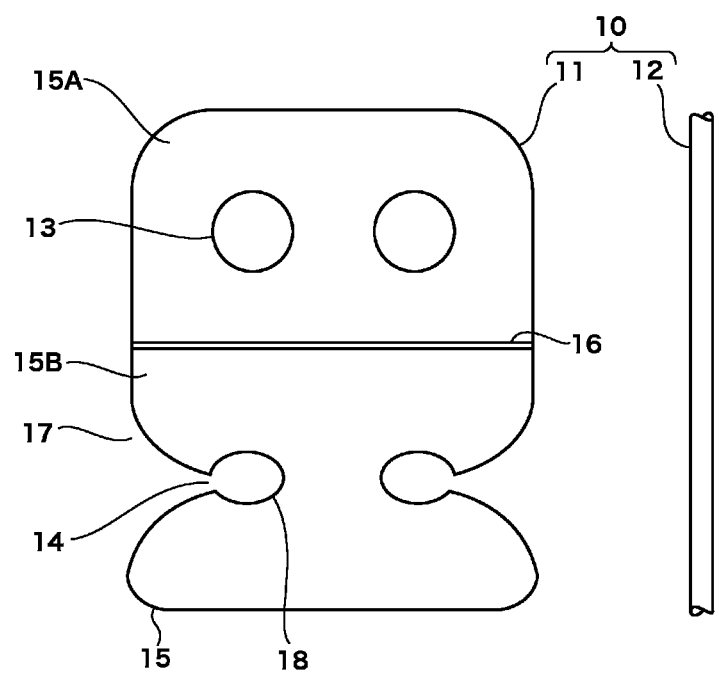
FIG. 1 is a drawing illustrating an example of a rope fixture of a bag opening binding tool in Embodiment 1.

The present application is based on Japanese Patent Application No. 2013-177729 filed on Aug. 29, 2013 in Japan. The content forms part thereof as the content of the present application. The present invention will be more completely understood by the detailed description provided hereinafter. Further areas of applicability of the invention will become more apparent from the detailed description provided hereinafter. However, it should be understood that the detailed description and specific examples indicate desired embodiments of the invention, and are provided for the purpose of illustration only because it will be apparent to those skilled in the art that various modifications and variations can be made without departing from the spirit or scope of the present invention from the detailed description. Applicants have no intention to present any described embodiments to the public, and among modifications and variations, the subject matter that may not be fallen within the scope of claims should also be part of the invention under the doctrine of equivalents.

An embodiment of the invention will be described below with reference to the drawings. Additionally, in the respective drawings, the same reference numerals will be given to mutually the same or corresponding portions, and duplicate description will be omitted.

First Embodiment

Configuration of Rope Fixture

An example of a rope fixture 11 of a bag opening binding tool 10 related to the present embodiment is illustrated in FIG. 1. In the present embodiment, an example in which through-holes 13 passing through a closing rope 12 are two and slits 14 nipping and locking the closing rope 12 are two is illustrated. The rope fixture 11 is formed of a flat plate-shaped body 15 obtained by rounding corners of, for example, a rectangle which is 50 mm long and 40 mm wide. The corners are rounded in order not to damage a flexible container bag and in order to press a bag body with a flat plate-shaped surface of the plate-shaped body 15 rather than sides or corners thereof. Although the diameter of the closing rope 12 to be used can be appropriately selected, the diameter is, for example, 7 mm. Although the thickness of the plate-shaped body 15 can be appropriately selected according to the weight of contents, the thickness is, for example, 1 mm to 3 mm.

A groove 16 is formed to bisect the portion of the plate-shaped body 15 in a long side direction so that bending is allowed in the shape of a hinge with the groove 16 as a rotational axis. One of the bisected portions is referred to as a first plate-shaped portion 15A, and the other is referred to as a second plate-shaped portion 15B. Since the hinge is provided, when a force for flexing the plate-shaped body 15 is applied, the portion of the groove 16 that constitutes the hinge is bent. As a result, the force applied to the plate-shaped body 15 can be released, and the fracture resistance of the plate-shaped body 15 can be improved. Additionally, if the groove 16 is made shallow, the portion of the groove 16 is not bent and is flexed more greatly than the other portions when the force for flexing the plate-shaped body 15 is applied. Even in this aspect, the force applied to the plate-shaped body 15 can be released, and the fracture resistance of the plate-shaped body 15 can be improved.

The two through-holes 13 are provided in the first plate-shaped portion 15A of the plate-shaped body 15. The dimensions of the through-holes 13 are determined so that the closing rope 12 can be locked. For example, the through-holes 13 are made circular and the dimensions thereof are made slightly greater than or equal to the diameter of the closing rope 12 to such a degree that the closing rope 12 can pass through the through-holes but the closing rope 12 can be locked. For example, the dimensions of the through-holes are set to $(7+\Delta)$ that slightly exceeds the diameter of the closing rope 12, for example, $\Delta=0$ mm to 2 mm. Additionally, for example, the dimensions of the through-holes 13 may be $(7-\Delta)$ mm$\phi$ that falls slightly below the diameter of the closing rope 12. Making the dimensions slightly smaller increases the effect of compressing and locking the closing rope 12. Additionally, a value measured in a natural state where no force is applied is used as the diameter of the closing rope 12.

The two through-holes 13 are arranged in the first plate-shaped portion 15A so that centers thereof are located in the middle in a longitudinal direction (the long side direction of the plate-shaped body 15) and at positions equally dividing the width into three portion in a lateral direction (a short side direction). Additionally, since these positions do not need to be accurate, these positions may have approximate values.

The two slits 14 are provided in the second plate-shaped portion 15B of the plate-shaped body 15. An insertion opening 17 located at a lateral side of the plate-shaped body 15 is provided at one end of each slit 14, and a rope locking portion 18 which is locked while allowing the closing rope 12 to pass therethrough is provided at the other end of the slit. The insertion openings of the two slits 14 are respectively provided at two opposed lateral sides of the plate-shaped body 15. With such a configuration, forces applied to two tip portions of the closing rope 12 are simultaneously directed in the same direction in many cases. Thus, in such a case, even if a force is applied in any direction within a plate surface, at least one of the two tip portions does not move, and the movement of the other tip portion is inhibited. Thus, the closing rope 12 does not extremely easily come off from the rope fixture 11. Additionally, if the two tip portions of the closing rope 12 are pulled in the directions of the insertion openings 17 of the respective slits, the tip portions of the closing rope 12 can be easily released from the rope locking portions 18 of the slits 14. Each slit 14 becomes gradually narrower from the insertion opening 17 side and becomes the narrowest at an entrance for the rope locking portion 18. The dimensions of the rope locking portions 18 are determined so that the closing rope can be locked. For example, the rope locking portions 18 are made elliptical (may be oval) and the dimensions of a minor axis thereof are made slightly smaller than or equal to the diameter of the closing rope 12 to such a degree that there is no hindrance in passing the closing rope 12 through the rope locking portions. Making the dimensions slightly smaller compresses to increase the effect of locking the closing rope 12. For example, the dimension of the minor axis of each rope locking portion 18 is set to $(7-\Delta)$ mm$\phi$ that falls slightly below the diameter of the closing rope 12, and the dimensions of the rope locking portion 18 are set to an elliptical shape of 7 mm$\times(7-\Delta)$ mm, for example, $\Delta=0$ mm to 2 mm.

The centerline of each slit 14 is linear in the short side direction (lateral direction) of the plate-shaped body 15, and is arranged so that the center of each rope locking portion 18 is located in the middle in the longitudinal direction and at a position that equally divides the width into three in the lateral direction.

The groove 16, which bisects the plate-shaped body 15 and is linear in the short side direction of the plate-shaped body 15, is formed between the through-holes 13 and the slits 14 of the rope fixture 11, and the plate-shaped body 15 is bendable in the shape of a hinge with the groove 16 as an axis or is flexible so as to be flexed more greatly at the portion of the groove 16 than at the other portions. Since the hinge is provided, when a force for flexing the plate-shaped body 15 is applied (for example, when forces are applied in opposite directions at both ends to the force applied to the center of the plate-shaped body 15), the portion of the groove 16 that constitutes the hinge is bent, or the portion of the groove 16 is flexed more greatly than the other portions. As a result, the force applied to the plate-shaped body 15 can be released, and the fracture resistance of the plate-shaped body 15 can be improved.

In the present embodiment, the longitudinal direction of each slit 14 is perpendicular (parallel to a short side) to a long side of the plate-shaped body 15. Here, the "perpendicular" only has to be substantially perpendicular, 80 degrees or more is preferable and 85 degrees or more is more preferable. The fracture resistance of the rope fixture 11 in the vicinity of the insertion openings 17 can be kept strong by making the longitudinal direction of each slit perpendicular to a long side of the plate-shaped body 15 in this way.

Although the shape, dimensions, and material of the rope fixture 11 can be appropriately selected, it is desirable to include the following features when a case where the rope fixture is used for the flexible container bag is taken into consideration.

(a) The rope fixture has a strength such that the rope fixture is not damaged by the weight of the flexible container bag.

The rope fixture has a strength such that the rope fixture is not fractured, for example, when a pressing force is applied with a force of 10 tons (although the weight of a flexible container bag filled with contents is various depending on the contents or the volume of the bag body, for example, one bag has one ton), and a strength such that the rope fixture is not damaged, for example, when a flexing force of 10 tons is applied. Additionally, although a large margin is taken for 10 tons, the margin may be made small according to the load of contents to be saved.

(b) The flexible container bag 20 and the closing rope 12 are not damaged.

(c) The closing rope has elasticity such that the operation of attaching and detaching the closing rope 12 to/from the slits 14 that lock the closing rope 12 is easily performed and a force (elasticity, anti-slipping) for suitably holding down the attached closing rope 12.

(d) Heat resistance: the above performance is maintained at a temperature at which normal operation or storage is performed.

When the above conditions are taken into consideration, plastic or metal is suitable. Polypropylene, polyethylene, vinyl chloride, or the like, or resin materials obtained by mixing these are suitable as the plastic. Aluminum, stainless steel, or the like is suitable as metal.

Although the dimensions and material of the closing rope 12 can also be appropriately selected, (standardized) ropes with specifications that are generally used can be used.

As general ropes, the following ropes are used, (a) Ropes having a diameter of 6 mm, 7 mm, 8 mm, or the like, (b) Ropes made of polyethylene, polyester, nylon, Cremona (registered trademark), acrylics, cotton, hemp, or materials obtained by mixing (using together) these materials, or the like as materials, and (c) Ropes obtained through three strand braiding, twelve strand braiding, a crossing rope, sixteen strand braiding, thirty two strand braiding, or the like, as spinning-and-weaving methods.

In this way, the rope fixture 11 in the present embodiment is made of the plate-shaped body 15, and has the through-holes 13 that allow the closing rope 12 to pass therethrough, and the slits 14 that nip and lock the closing rope 12. The dimensions of the through-holes 13 and the dimensions of the rope locking portions 18 are set such that the closing rope 12 can be locked. Accordingly, the binding of the bag body can be ensured when the bag openings of the bag body are closed, and the releasing work of the closing rope 12 that has bound the bag openings can be facilitated in the discharge work of contents. That is, a state where the binding is not easily released during storage or movement of the flexible container bag can be brought about, the efficiency of the releasing work can be enhanced, and any danger caused by dropping of contents can also be reduced such that working hours under the flexible container bag do not become long.

In a case where the numbers of the through-holes 13 and the slits 14 are two, respectively, a totaled locking force of the through-holes 13 and a totaled locking force of the slits 14 become strong. Since the through-holes 13 are circular, the closing rope is locked over the whole circumferences of the through-holes, and since forces are uniformly applied to the whole circumferences, there are advantages that the through-holes 13 are not easily fractured and the closing rope 12 is not easily cut. In contrast, in a case where the numbers of the through-holes 13A and the slits 14A are one, respectively, there are advantages that the rope fixture 11H can be made compact, and a rope passing-through process and a rope locking process are easily performed at once, respectively.

Additionally, according to the present embodiment, it the bag opening binding tool 10 formed by the combination of the rope fixture 11 and the closing rope 12, which can ensure the binding of the bag body when the bag openings of the bag body are closed, and can facilitate the releasing work of the closing rope 12 that has bound the bag openings in the discharge work of contents, can be provided.

[Example of Flexible Container Bag]

Figure 2A:
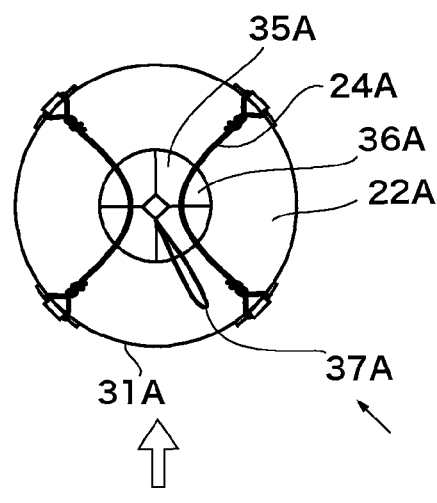
FIG. 2A is a top view illustrating an example of a flexible container bag.
Figure 2B:
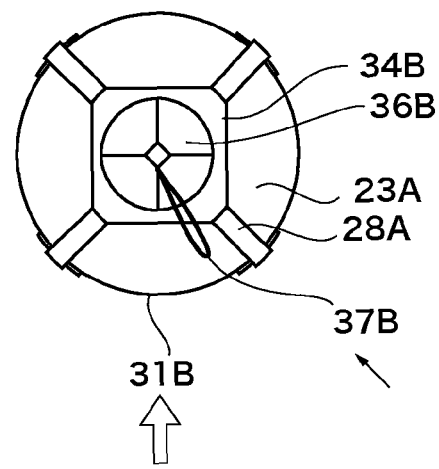
FIG. 2B is a bottom view illustrating an example of a flexible container bag.
Figure 2C:
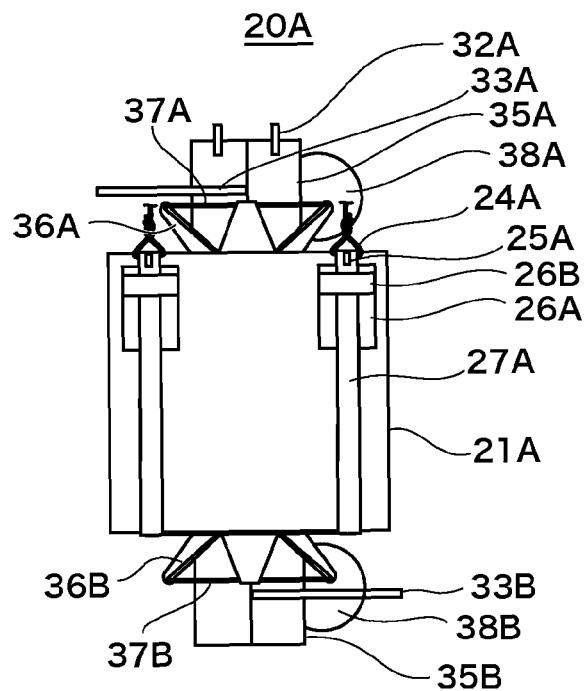
FIG. 2C is a side view illustrating an example of a flexible container bag.
Figure 2D:
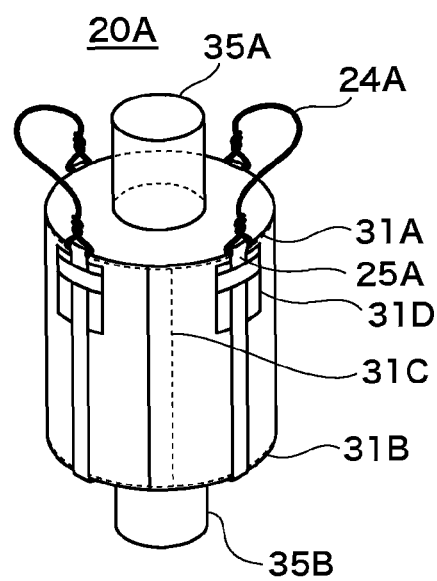
FIG. 2D is a perspective view illustrating an example of a flexible container bag.

An example of a cylindrical flexible container bag (bag body) 20A is illustrated in FIG. 2A to FIG. 2D (prepared based on "Flexible Container Instructions Manual" published by Japanese Flexible Containers). A top view is illustrated in FIG. 2A, a bottom view is illustrated in FIG. 2B, a side view is illustrated in FIG. 2C, and a perspective view is illustrated in FIG. 2D. Here, in order to make the invention easily understood, the top view and the bottom view illustrate a state where opening portions (bag openings, that is, a charging opening and a discharge opening) are closed, and the side view and the perspective view illustrate a state where the opening portion is opened. Additionally, an upper lid holder is omitted in the perspective view. Additionally, although FIG. 2C is viewed from a direction of a thick arrow of FIGS. 2A and 2B, the portion of an upper lid holder 36A is illustrated in a drawing viewed from a direction (a direction of a thin arrow of FIG. 2A) inclined at 45 degrees, and the portion of a lower lid holder 36B is illustrated in a drawing viewed from a direction (a direction of a thin arrow of FIG. 2B) inclined at 45 degrees.

In the flexible container bag 20A, a bag body is constituted by a side surface 21A, an upper surface 22A, and a lower surface 23A. The side surface 21A is joined to the upper surface 22A with an upper joining portion 31A on an upper surface side and is joined to the lower surface 23A with a lower joining portion 31B on a lower surface side. The side surface 21A is formed by joining two lateral sides of a square together with a trunk joining portion 31C, and the bag body becomes a columnar bag body in a state where contents are filled. Additionally, in order to reinforce the bag body, reinforcing fabric 26A is attached but the reinforcing fabric 26A is joined to the side surface 21A with a hanging portion joining portion 31D. Although the joining is typically performed by sewing, heat fusion is also possible.

Hanging belts 27A are attached to the cylindrical side surface 21A in the longitudinal direction so as to equally divide the side surface 21A into four in a lateral direction. Portions of the hanging belts 27A extended to the lower surface 23A are hanging belts 28A. A filling hook 25A (loop that allows the hanging rope 24A to pass therethrough) is formed on each hanging belt 27A so as to allow the hanging rope 24A to pass therethrough at a boundary with the upper surface 22A. The hanging rope 24A is hooked to the filling hooks 25A and is used in order to hang up and move the flexible container bag 20A. Belts adjacent to each other among the four hanging belts 27A make a pair, both ends of the hanging rope 24A are attached to the respective filling hooks 25A of the pair of hanging (adjacent) belts 27A, and a total of two hanging ropes 24A are attached to one bag body 20A and are used in order to hang up the bag body.

A string passing-through hole is formed at a tip of each hanging belt 28A so as to allow a lower rope 34B to pass therethrough. The lower rope 34B is stretched through the string passing-through holes of tips of four hanging belts 28A and tips of the lower rope 34B are connected together. As a result, the lower surface 23A is supported by the lower rope 34B when contents are filled, and the discharge opening 35B is kept from inclining by the lower rope 34B when the discharge opening 35B is opened. Additionally, in each hanging belt 27A, the reinforcing fabric 26A is attached and reinforced near each filling hook 25A, and reinforcing fabric (belt tilting stop) 26B is attached on the side of the reinforcing fabric 26A close to the filling hook 25A and is further reinforced.

A small cylindrical charging opening 35A is formed at the center of the upper surface 22A. The charging opening 35A is built and attached inside the upper surface 22A. A slit is provided in the shape of a cross at a central portion of the upper surface 22A so that the upper surface can be opened so as to be turned over in four directions. Additionally, center sides of four pieces (upper lid holders) 36A divided by the slit are provided with string passing-through holes that allow the upper lid holder rope (closing rope) 37A to pass therethrough. If the upper lid holder rope 37A is pulled through the string passing-through holes of the four upper lid holders 36A, tips of the four upper lid holders 36A are narrowed down to the center of a circle, and the charging opening 35A is closed. A circular upper lid 38A having a slightly greater radius than a small circle of the charging opening 35A is joined (may be separated) inside one of the four upper lid holders 36A. When the charging opening 35A is closed, the upper lid 38A is put into the outside of the charging opening 35A and the inside of the four upper lid holders 36A, and the upper lid holder rope (closing rope) 37A is pulled. Accordingly, since the slit is covered with the upper lid 38A, the contents within the bag can be prevented from leaking out from the charging opening 35A. A string passing-through hole that allows a charging opening binding string 33A to pass therethrough is provided around the bag opening of the charging opening 35A, and if the charging opening binding string 33A is pulled through the string passing-through hole, the charging opening 35A is closed. Accordingly, the charging opening 35A can be doubly binded using the charging opening binding string 33A and the upper lid holder rope 37A. Additionally, a string passing-through hole is formed in a charging opening hook 32A, and a state where the charging opening 35A is opened can be maintained during charging by hooking a string or the like to the string passing-through hole and pulling the string upward.

A small cylindrical discharge opening 35B is formed at the center of the lower surface 23A. The discharge opening 35B is attached inside the lower surface 23A. A slit is provided in the shape of a cross at a central portion of the lower surface 23A so that the lower surface can be opened so as to be turned over in four directions. Additionally, center sides of four pieces (lower lid holders) 36B divided by the slit are provided with string passing-through holes that allow the lower lid holder rope (closing rope) 37B to pass therethrough. If the lower lid holder rope 37B is pulled through the string passing-through holes of the four lower lid holders 36B, tips of the four lower lid holders 36B are narrowed down to the center of a circle, and the discharge opening 35B is closed. A circular lower lid 38B having a slightly greater radius than a small circle of the discharge opening 35B is joined (may be separated) inside one of the four lower lid holders 36B. When the discharge opening 35B is closed, the lower lid 38B is put into the outside of the discharge opening 35B and the inside of the four lower lid holders 36B, and the lower lid holder rope (closing rope) 37B is pulled. Accordingly, since the slit is covered with the lower lid 38B, the contents within the bag can be prevented from leaking out from the discharge opening 35B. A string passing-through hole that allows a discharge opening binding string 33B to pass therethrough is provided around the bag opening of the discharge opening 35B, and if the discharge opening binding string 33B is pulled through the string passing-through hole, the discharge opening 35B is closed. Accordingly, the discharge opening 35B can be doubly binded using the discharge opening binding string 33B and the lower lid holder rope 37B.

The flexible container bag 20A saves, for example, soil and is used as a sandbag. Additionally, grains and other various things can be saved and carried. The container bag has flexibility and is foldable. The hanging rope 24A is used in order for the bag to be hung up and carried with a forklift or a crane. The flexible container bag 20A is roughly classified into two types of a cross type that is used one time or several times and a running type that is repeatedly usable. The cross type is prepared by sewing woven fabric called a "sheet". The running type is prepared by connecting sheet-like materials together through high-frequency welding or heat welding.

The side surface 21A, the upper surface 22A, the lower surface 23A, the hanging belts 27A and 28A, the reinforcing fabric 26A, the upper lid holders 36A, the lower lid holders 36B, the upper lid 38A, the lower lid 38B, the charging opening 35A, and the discharge opening 35B of the flexible container bag 20A are formed of a sheet.

The "sheet" to be used with the cross type is typically a woven fabric which is vertically and horizontally woven using broad yarn made of polypropylene. Yarn made of synthetic resin (polyethylene, vinyl chloride, or the like) other than polypropylene or hemp yarn may be used. Tensile strength is increased by adopting the woven fabric. Additionally, since the sheet has flexibility, the flexible container bag is foldable, and can be folded, stacked and kept during non-use. In order that the side surface 21A, the upper surface 22A, the lower surface 23A, the hanging belts 27A and 28A, the reinforcing fabrics 26A and 26B, the upper lid holders 36A, the lower lid holders 36B, the upper lid 38A and the lower lid 38B may withstand the load of contents and not easily be fractured, a thick sheet is used. Compared to this, a thin sheet is used so that the charging opening 35A and the discharge opening 35B are soft and foldable.

[Tightness Condition of Closing Rope]

Figure 3A:
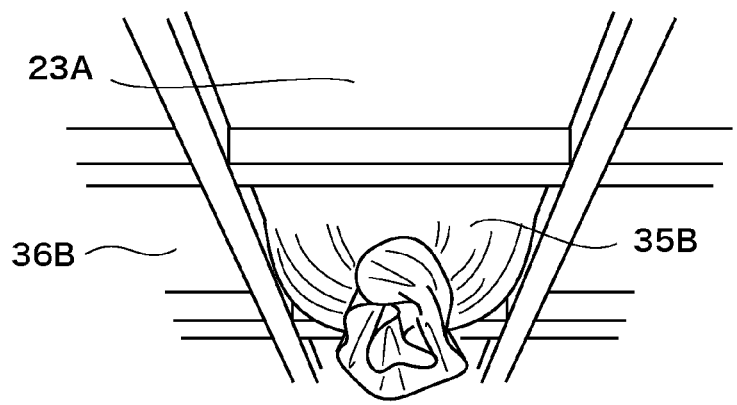
FIG. 3A is a drawing illustrating an example of the state where there is no lower lid holder rope.
Figure 3B:
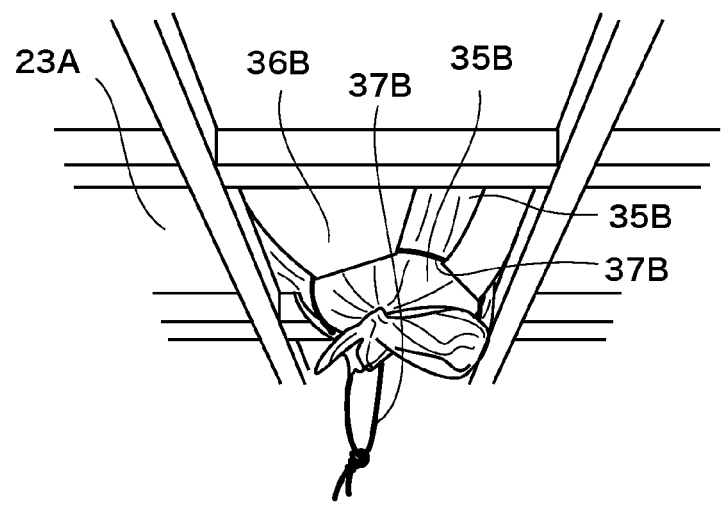
FIG. 3B is a drawing illustrating an example of the state where the lower lid holder rope is loosened.
Figure 3C:
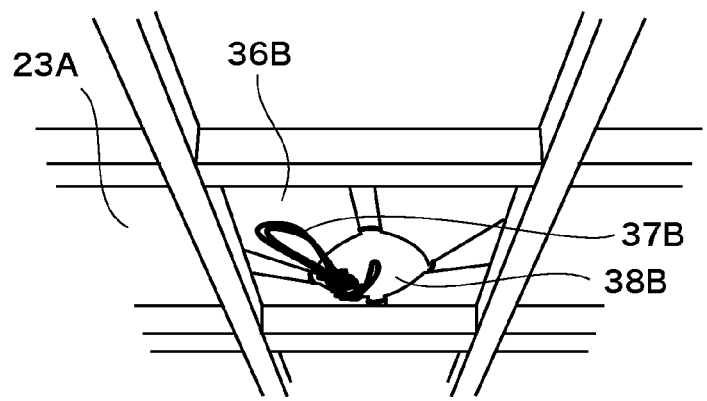
FIG. 3C is a drawing illustrating an example of the state where the lower lid is normally set and the lower lid holder rope is tightened.

FIG. 3A to FIG. 3C illustrate examples of the state of bag openings formed by a difference in the tightness condition of the closing rope. A state where there is no lower lid holder rope (discharge opening closing rope) 37B is illustrated in FIG. 3A. The lower lid holder rope 37B cannot be pulled to cover a central portion of the lower surface 23A with the lower lid holders 36B. Therefore, although a knot is formed in the discharge opening 35B itself or vicinities of the discharge opening 35B are connected together with a rope or the like to prevent contents from leaking, the discharge opening 35B protrudes from the lower lid holders 36B to the outside in a state in which the lower lid holders 36B are opened.

A state where the lower lid holder rope (discharge opening closing rope) 37B is loosened is illustrated in FIG. 3B. Although the lower lid holder rope 37B is pulled to cover the central portion of the lower surface 23A with the lower lid holders 36B, since the lower lid holder rope 37B is loosened, the central portion of the lower surface 23B is halfway covered with the lower lid holders 36B, and a portion of the discharge opening 35B is visible to the outside from the lower lid holders 36B.

A state where the lower lid 38B is normally set and the lower lid holder rope 37B is tightened is illustrated in FIG. 3C. The lower lid holder rope 37B is pulled to cover the portion of the lower surface 23A up to near its central portion with the lower lid holders 36B. The lower lid 38B is placed under the discharge opening 35B at the central portion of the lower surface 23A, the lower lid 38B is supported from the bottom by the lower lid holders 36B, and the discharge opening 35B is not visible to the outside. The lower lid holder rope 37B is tied so as not to be loosened, and the discharge opening 35B is tied up. Additionally, if tip portions of the lower lid holder rope 37B are pulled in a state where the lower lid holder rope 37B is normally tied in this way, the knot of the lower lid holder rope 37B is untied.

Figure 4A:
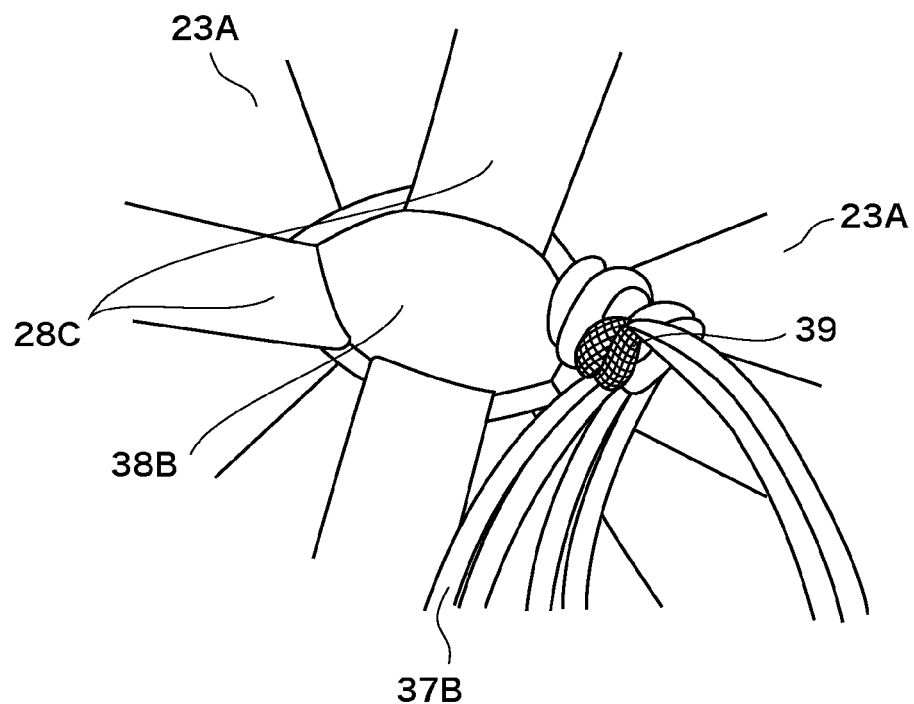
FIG. 4A is drawing illustrating an example of the state of the bag opening where a knot is tightened.
Figure 4B:
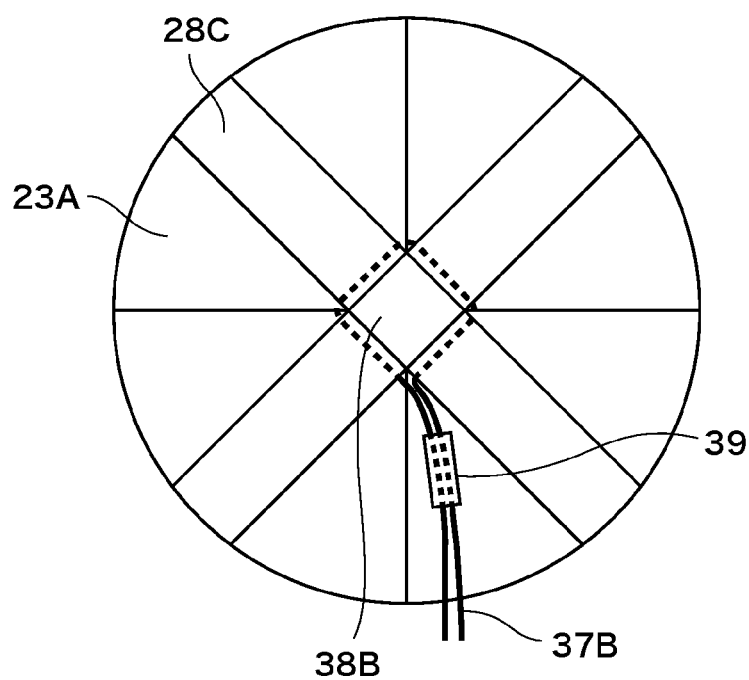
FIG. 4B is drawing illustrating an example of the state of the lower surface where a knot is tightened.

FIG. 4A to FIG. AB illustrates-an-example of the state of the bag opening where a knot is tightened. The state of the bag opening is illustrated in FIG. 4A, and the state of the lower surface 23A is illustrated in FIG. 4B. In the example of FIG. 4A to FIG. 4B, an opening is formed in the overall lower surface 23A by a cross-shaped nick instead of the opening being formed in the small circular portion (lower lid holders 36B) as illustrated in FIG. 2A to FIG. 2D. As illustrated in FIG. 4B, a reinforcing belt 28C is attached to the outside of the lower surface 23A, and a string passing-through hole that allows the lower lid holder rope 37B to pass therethrough is formed at a tip (the central portion side of the lower surface 23A) of the reinforcing belt 28C.

After the lower lid holder rope 37B passing through the tip of the reinforcing belt 28C is pulled to narrow the bag opening, two tip portions of the lower lid holder rope 37B may be gathered and passed through a tube 39 called a rope slider. The tube 39 may be made to slide to the central portion of the lower surface 23A, and the lower lid holder rope 37B may be tied to make a knot. Since the inside of the tube 39 is hollow and a tube diameter is made such that the two tip portions can pass through the inside of the tube by a pulling force being applied thereto, the two tip portions are fixed by the tube 39 when the pulling force is not applied. That is, the tube 39 is used as a stopper that prevents the lower lid holder rope 37B from being loosened. Originally, if the tip portions of the lower lid holder rope 37B are pulled, the knot of the lower lid holder rope 37B is untied. However, in the example of FIG. 4A to FIG. 4B, since the tube 39 used instead of the stopper is soft, the lower lid holder rope 37B is also engulfed and becomes tight in the tube 39. Therefore, even if the tip portions of the lower lid holder rope 37B are pulled, it is difficult to untie the knot of the lower lid holder rope 37B.

[Bag Opening Binding Method]

Figure 5:
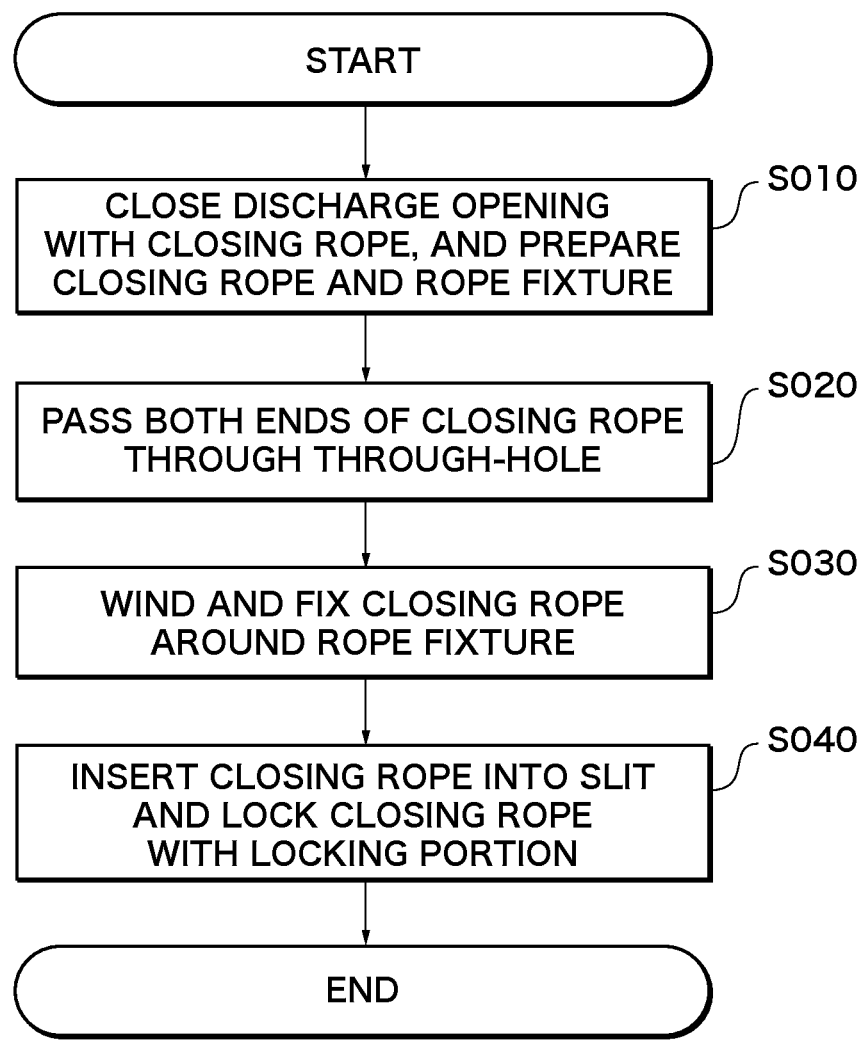
FIG. 5 is a drawing illustrating an example of a bag opening binding method in Embodiment 1.

FIG. 5 illustrates an example of a bag opening binding method in Embodiment 1.

First, the discharge opening 35B is closed with the closing rope 12 of the bag opening binding tool 10, and the rope fixture 11 of the bag opening binding tool 10 is prepared (S010). In the present embodiment, since the closing rope is the lower lid holder rope 37B, the lower lid holder rope 37B is pulled to gather the tips of the lower lid holders 36B at the central portion of the lower surface 23A. Next, the two tip portions of the closing rope 12 are respectively passed through the two through-holes 13 of the rope fixture 11 (S020: rope passing-through process). The dimensions of the through-holes 13 are determined so that the closing rope 12 can be locked. For example, since the diameter of the through-holes 13 is slightly greater than or equal to the diameter of the closing rope 12, the closing rope 12 can be firmly locked to the through-holes 13 with a frictional force. The number of the through-holes is two, and portions where the closing rope 12 comes in contact with the through-holes 13 increase as compared to a case where one through hole is provided, and a frictional force becomes large. As a result, the closing rope is strongly locked. Here, the rope fixture 11 is pressed against the central portion of the lower surface 23A so that the closing rope 12 is not loosened, and the closing rope 12 is pulled out as much as possible from the through-holes 13. Here, the closing rope 12 is not passed through the slit 14 but through the through-holes 13 in order to keep so that the closing rope 12 does not come off from the rope fixture 11.

Next, the closing rope 12 is wound around the rope fixture 11 so that the position of the closing rope 12 is not shifted (S030: rope winding process). By hooking the closing rope 12 to the lateral sides of the rope fixture 11, pulling the closing rope, and winding the closing rope around the rope fixture 11, the closing rope 12 can be firmly fixed to the rope fixture 11 by using a tension applied to the closing rope 12. Then, the closing rope can be more firmly fixed as the number of times of winding is increased.

Next, the closing rope 12 is locked to the rope locking portions 18 of the slits 14 (S040: rope locking process). The dimensions of the rope locking portions 18 are determined so that the closing rope 12 can be locked. For example, since the minor axis of the elliptical rope locking portions 18 is slightly smaller than or equal to the diameter of the closing rope 12, the closing rope 12 can be firmly locked to the rope locking portions 18 with a compressive force. The number of the slits is two, and portions where the closing rope 12 comes in contact with the rope locking portions 14 increase as compared to a case where one slit is provided, and a compressive force becomes large. As a result, the closing rope is strongly locked. Additionally, since the insertion openings of the two slits 14 are respectively provided at two opposed lateral sides of the plate-shaped body 15, the closing rope 12 does not extremely easily come off from the rope fixture 11. Even here, the closing rope 12 can be firmly locked by using the tension of the closing rope 12 by pulling out the closing rope 12 as much as possible from the rope locking portions 18. Accordingly, the bag openings of the flexible container bag 20 are bound. Since the bag openings of the flexible container bag 20A are bound using the rope fixture 11 and using the tension of the closing rope 12, the binding of the bag body can be ensured when the bag openings are closed. Additionally, if each closing rope 12 locked to the rope locking portions 18 is moved in each direction of the insertion openings 17 along the slits 14 during the discharge work of contents, the closing rope 12 can be easily released from the slits 14. Thus, the releasing work of the closing rope 12 can be easily performed. Additionally, even if the rope winding process is omitted, the closing rope 12 can be locked to the rope fixture 11.

Figure 6:
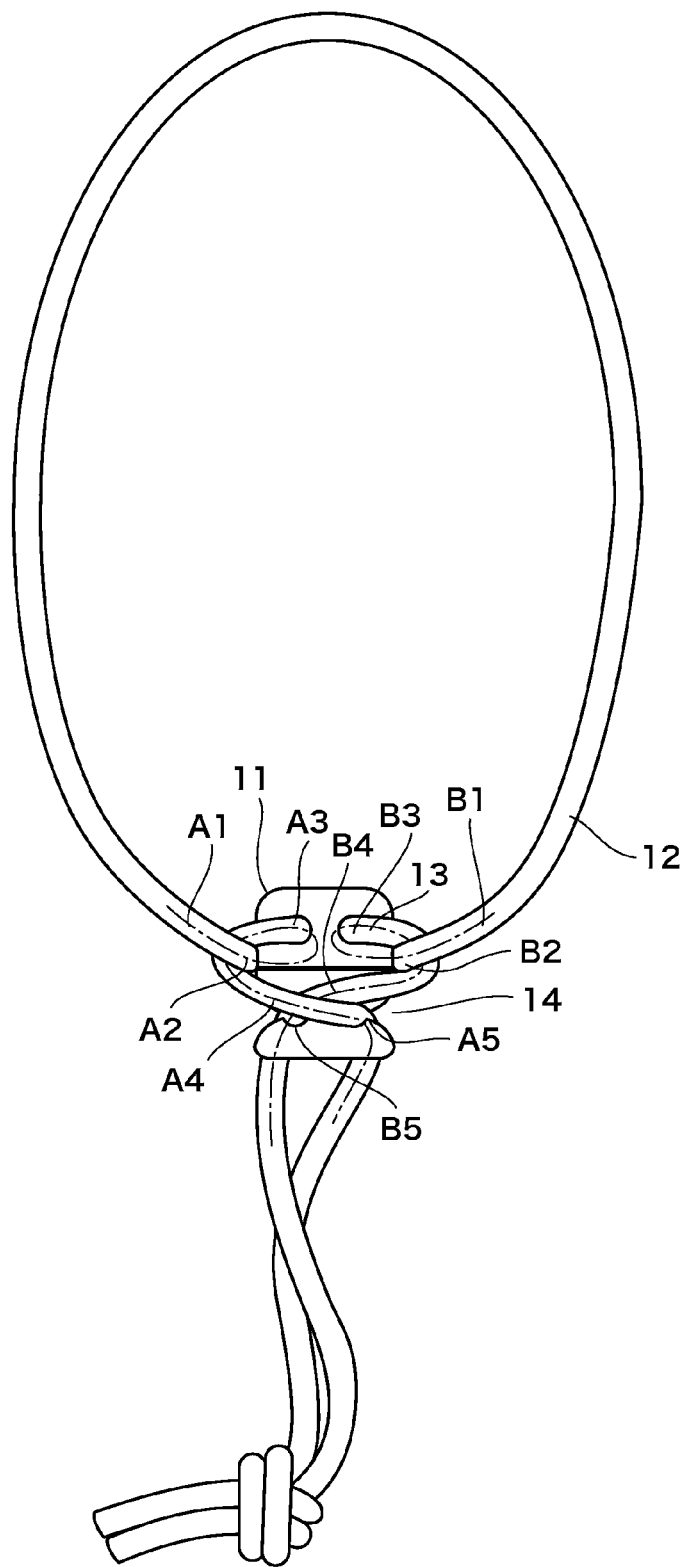
FIG. 6 is a drawing illustrating an example of a method for passing a closing rope through the rope fixture in Embodiment 1.

FIG. 6 is a drawing illustrating an example of a method for passing the closing rope 12 through the rope fixture 11. In the drawing, a central axis of the closing rope 12 is illustrated by a one-dot chain line. First, the closing rope (lower lid holder rope) 12 is pulled to close the discharge opening 35B (refer to FIG. 2C). Next, the two tips of the closing rope 12 are respectively passed through the two through-holes 13 of the rope fixture 11. The tips of the closing rope 12 are wound around the rope fixture 11 so as to run along, for example, A1→A2→A3 (the positions of the through-holes 13)→A4 and B1→B2→B3 (the positions of the through-holes 13)→B4 in this order. Then, the two tips of the closing rope 12 are respectively inserted into and locked to the locking portions 18 (A5 and B5) of the slits 14. Accordingly, the closing rope 12 is fixed to the rope fixture 11 in a state where the discharge opening 35B is bound.

The insertion openings 17 of the two slits are respectively provided at the two opposed lateral sides of the plate-shaped body 15A. The two tip portions of the closing rope 12 that have passed through the rope locking portions 18 (A5 and B5) of the slits 14 are typically tied as illustrated in FIG. 6 or are bundled through the rope slider 39 (refer to FIG. 4A to FIG. 4B). The rope slider 39 is, for example, a tube made of an elastic body, such as a vinyl tube, and is configured such that the tip portions of two closing ropes 12 that have passed through the rope locking portions 18 of the two slits 14, respectively, are bundled and passed through the tube, the tip portions of the two closing ropes 12 slide inside the tube if pulling forces are applied to the tip portions of the two closing ropes 12, and the tip portions of the two closing ropes 12 are locked within the tube if the pulling forces are removed. If the tips of the closing ropes 12 are tied or passed through the rope slider 39, the configuration is preferable because the closing ropes 12 do not more easily come off from the rope fixture 11. That is, even if the closing rope 12 of which the tip portions have been tied or bundled is pulled toward one of the insertion openings 17 of the slits, the locking portion 18 of the slit 14 having the insertion opening 17 on the other side inhibits the movement of the closing rope 12. Thus, the closing rope 12 does not come off from the rope fixture 11. Even when the tip portions are not tied or bundled, since the two tip portions of the closing rope 12 are gripped together and moved in many cases except when the closing rope 12 is released, the closing rope 12 does not easily come off from the rope fixture 11. When the closing rope 12 is released, the tip portions of the closing rope 12 can be easily released from the slits 14 as follows. The knot is untied when the tip portions are tied, or the tip portions are extracted from the rope slider 39 when the rope slider 39 is provided. Then, the tip portions of the closing rope 12 locked to the rope locking portions 18 of the two slits 14 are pulled toward the respective insertion openings 17. Thus, the tip portions of the closing rope 12 can be easily released from the slits 14. Then, the closing rope 12 can be released from the rope fixture 11 by pulling out the tip portions of the two closing ropes 12 from the through-holes 13.

[Another Example of Flexible Container Bag]

Figure 7:
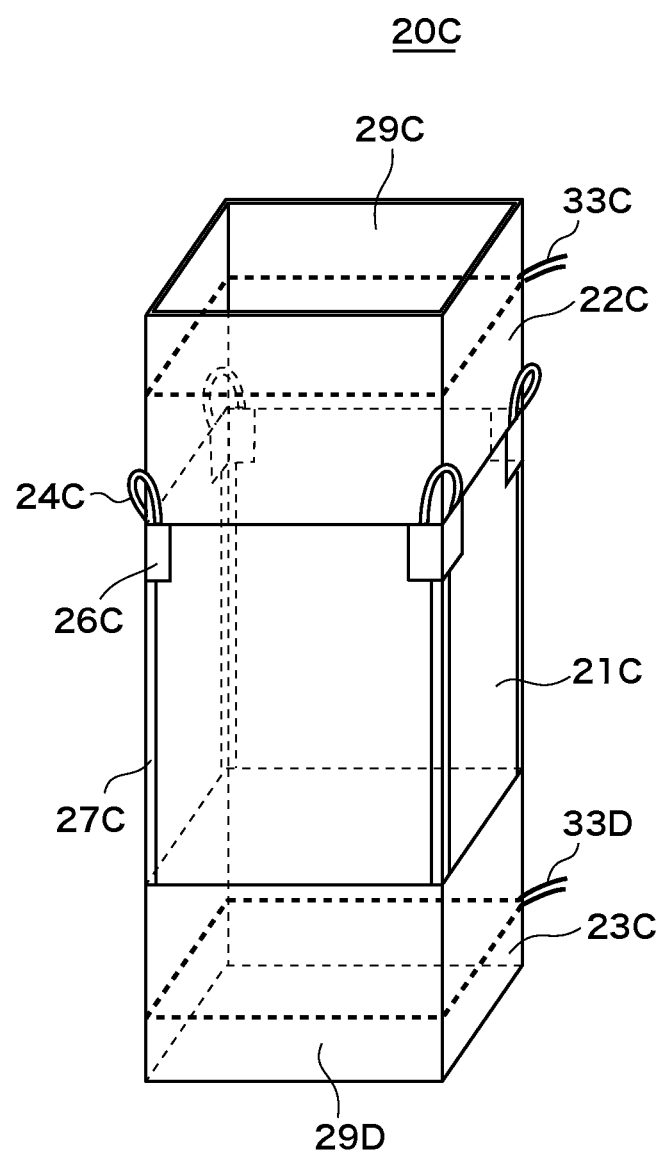
FIG. 7 is a drawing illustrating another example of the flexible container bag.

FIG. 7 illustrates another example of the flexible container bag. The application to a bag opening binding tool 10 of the present embodiment is not limited to the flexible container bag described in FIG. 2A to FIG. 2D, and the invention can be applied to all types of flexible container bags.

In FIG. 7, a flexible container bag 20C includes a rectangular tubular bag body (a side surface 21C, an upper surface 22C, and a lower surface 23C) that saves contents, a hanging belt 24C for hanging up the bag body, reinforcing fabric 26C for reinforcing the bag body, and a reinforcing belt 27C. Four hangers 24C that allow a forklift or the like to pass therethrough are attached to four corners of a square constituted by the boundaries of the side surface 21C and the upper surface 22C.

String passing-through holes that allow a charging opening binding string 33C and a discharge opening binding string 33D therethrough are respectively formed in the upper surface 22C and the lower surface 23C. Before contents are saved in the flexible container bag 20C, in the lower surface 23C, the discharge opening binding string 33D is pulled to narrow the discharge opening 29D and the discharge opening binding string 33D is tied to close a bag opening of the lower surface 23C. After contents are saved in the flexible container bag 20C, in the upper surface 22C, the charging opening binding string 33C is pulled to narrow the charging opening 29C and the charging opening binding string 33C is tied to close a bag opening of the upper surface 22C. In the lower surface 23c, after the discharge opening binding string 33D is tied, each of two tips of the discharge opening binding string 33D are passed through each of the two through-holes 13 of the rope fixture 11 and wound around the rope fixture 11 and then are locked by the respective locking portions 18 of the two slits 14. Accordingly, the discharge opening 29D of the bag body is bound.

Additionally, the invention can be applied to all types of flexible container bags. For example, the bag body may be a cylindrical type, a triangular tubular type, a quadrangular tubular type, or a polygonal tubular type. The opening portions may be provided in entire regions of the upper surface and the lower surface or may be provided in partial regions, and the charging opening of the upper surface and the discharge opening of the lower surface may be same (in this case, the bag body is inverted and contents are discharged, during discharge). Additionally, the slits may be provided or may not be provided in the upper surface and the lower surface. If the slits are provided, a string passing-through hole may be provided at a central portion of each surface and a binding string may be passed through the string pass-through hole, and if the slits are not provided, each bag opening may be bundled and bound with a binding string. Additionally, although the bag opening binding tool is typically used when the lower surface is bound, it is also possible to use the bag opening binding tool when the upper surface is bound.

[Effects]

As described above, the rope fixture 11 in the present embodiment is made of the plate-shaped body 15, and has the through-holes 13 that allow the closing rope 12 to pass therethrough, and the slits 14 that nip and lock the closing rope 12, and the dimensions of the through-holes 13 and the dimensions of the rope locking portions 18 are adapted to be able to lock the closing rope 12. Accordingly, the binding of the bag body can be ensured when the bag openings of the bag body are closed, and the releasing work of the closing rope 12 that has bound the bag openings can be facilitated in the discharge work of contents.

Additionally, according to the present embodiment, the bag opening binding tool 10 formed by the combination of the rope fixture 11 and the closing rope 12, which can ensure the binding of the bag body when the bag openings of the bag body are closed, and can facilitate the releasing work of the closing rope 12 that has bound the bag openings in the discharge work of contents, can be provided.

Second Embodiment

Figure 8:
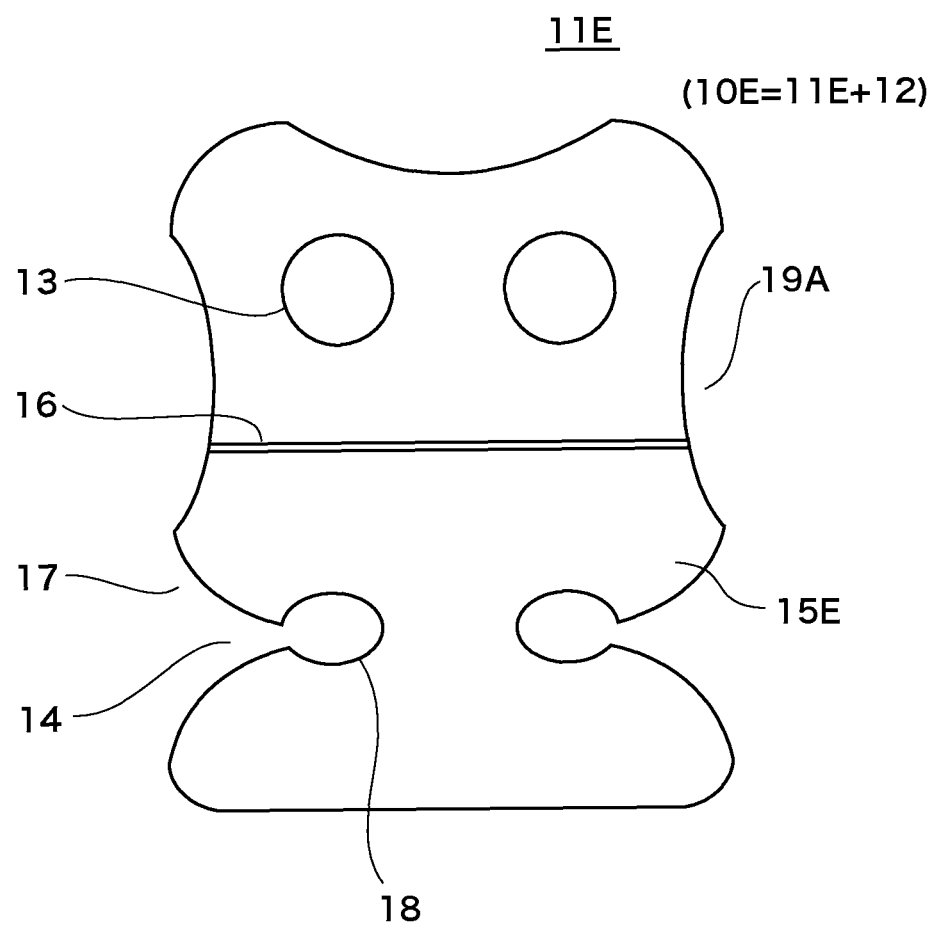
FIG. 8 is a drawing illustrating an example of a rope fixture of a bag opening binding tool in Embodiment 2.

An example of a rope fixture 11E of a bag opening binding tool 10E in Embodiment 2 is illustrated in FIG. 8. Description that duplicates that of Embodiment 1 will be omitted and different portions will mainly be described (this also applies to the following Embodiments). Additionally, since the closing rope is the same as that of Embodiment 1, the closing rope is not illustrated, and the reference numeral of the bag opening binding tool is illustrated in parentheses on the upper right of the drawing (this also applies to the following Embodiment). In Embodiment 1, the lateral sides of the plate-shaped body 15 are linear except for the corners. However, in the present embodiment, a plate-shaped body 15E is obtained by providing convex projections or convex depressions in suitable places of lateral sides within a plate surface, for example, at any of an upper side, a lower side, a left side, and a right side. FIG. 8 illustrates an example in which concave depressions 19A are provided at the upper side, the left side, and the right side. Accordingly, the closing rope (lower lid holder rope) 12 wound around the depressions 19A of the rope fixture 11E can be prevented from being moved and loosened. Additionally, in a case where the projections are provided instead of depressions, area increases and gripping becomes easy. Additionally, the depression may be provided in the middle of each projection to prevent loosening of the closing rope 12 or the projection may be provided in the middle of each depression 19A to bring the closing rope 12 into contact with the projections and to easily fix the closing rope.

The other configurations of the rope fixture 11E and the other configurations of the closing rope 12 are the same as those of Embodiment 1, and the bag opening binding method of FIG. 5 can also be applied to the present embodiment. The same effects as [Effects] described in Embodiment 1 are exhibited.

Third Embodiment

In Embodiment 3, an example without the hinge (groove 16) will be described. Even if there is no hinge, the closing rope 12 can be fixed to the rope fixture. If the hinge is provided as described in Embodiment 1, there is an advantage that, when the force for flexing the plate-shaped body 15 is applied, this force can be released and the fracture resistance of the plate-shaped body 15 can be improved. In contrast, if no hinge is provided, there are advantages that the manufacturing process becomes simple and that the plate-shaped body is strong against an impact force or pressing in a constant direction since the plate-shaped body 15 is integrated in one body.

The other configurations of the rope fixture and the other configurations of the closing rope are the same as those of Embodiment 1, and the bag opening binding method of FIG. 5 can also be applied to the present embodiment. The same effects as [Effects] described in Embodiment 1 are exhibited.

Forth Embodiment

Examples of rope fixtures 11K1 to 11K3 of bag opening binding tools 10K1 to 10K3 in Embodiment 4 are illustrated in FIG. 9A to FIG. 9C. Description that duplicates that of Embodiment 1 will be omitted and different points will mainly be described. Although the corners of the plate-shaped bodies 15 are rounded in Embodiment 1, the corners of the plate-shaped bodies 15K1 to 15K3 are obliquely cut in the present embodiment. Additionally, although the locking portions 18 of the slits 14 are elliptical in Embodiment 1, in the present embodiment, locking portions 18B1 to 18B3 of slits 14B1 to 14B3 have rectangular shapes that are long in an axis direction of the slits. Additionally, an example in which the slits 14 are provided in the directions perpendicular to the long sides of the plate-shaped body 15 is illustrated in Embodiment 1. However, in the present embodiment, an example in which the slits are provided in a direction perpendicular to long sides of the plate-shaped body 15K1 is illustrated in FIG. 9A, an example in which the slits are provided in directions inclined at 45 degrees toward the through-holes 13 from the perpendicular direction is illustrated in FIG. 9B, and an example in which the slits are provided in directions inclined at 45 degrees toward sides opposite to the through-holes 13 from the perpendicular direction is illustrated in FIG. 9C. Even if the locking portions 18B1 to 18B3 are rectangular, the length of the short sides of the rectangle is made slightly shorter as compared to the diameter of the closing rope 12. Thus, the closing rope 12 can pass through the locking portions 18B1 to 18B3 if the closing rope 12 is pulled, and the locking portions 18B1 to 18B3 compress the closing rope 12 to easily fix the closing rope 12 to the locking portions 18B1 to 18B3 during locking. Additionally, the groove 16 that is present in Embodiment 1 is eliminated in the present embodiment.

If a case where the rope locking portions 14 are elliptical as in Embodiment 1 is compared with a case where the rope locking portions 14B1 to 14B3 are rectangular as in the present embodiment, since the deformation of the closing rope 12 is relatively small in the case of the elliptical shape, there are advantages that the rope locking portions 14B1 to 14B3 are not easily fractured and the closing rope 12 is not easily cut. In contrast, since the deformation is relatively large in the case of the rectangular shape, there is an advantage that the range of applicable rope diameter extends. Additionally, if a case where the slits 14B1 are provided parallel to short sides of the plate-shaped body 15K1 as shown in FIG. 9A is compared with cases where the slits are inclined at ±45 degrees toward the through-hole 13 side as shown in FIG. 9B and FIG. 9C, the outsides of the two rope locking portions 18B1 of the plate-shaped body 15K1 are not easily fractured in the former case, and the portion between the two rope locking portions 14B2 to 14B3 of the plate-shaped bodies 15K2 to 15K3 is not easily fractured in the latter case. Additionally, in a case where the corners of the plate-shaped body 15 are rounded as in Embodiment 1, there are features that the bag body is held down with the flat plate-shaped surface and that does not damage the flexible container bag. In contrast, in a case where the corners are obliquely cut off as in the present embodiment, an acute angle disappears. Thus, there are features that the rope fixtures 11K1 to 11K3 do not easily damage the flexible container bag and that rope locking fixtures 11K1 to 11K3 are easily manufactured.

The other configurations of the rope fixture 11K1 to 11K3 and the other configurations of the closing rope 12 are the same as those of Embodiment 1, and the bag opening binding method of FIG. 5 can also be applied to the present embodiment. The same effects as [Effects] described in Embodiment 1 are exhibited.

Fifth Embodiment

Figure 10A:
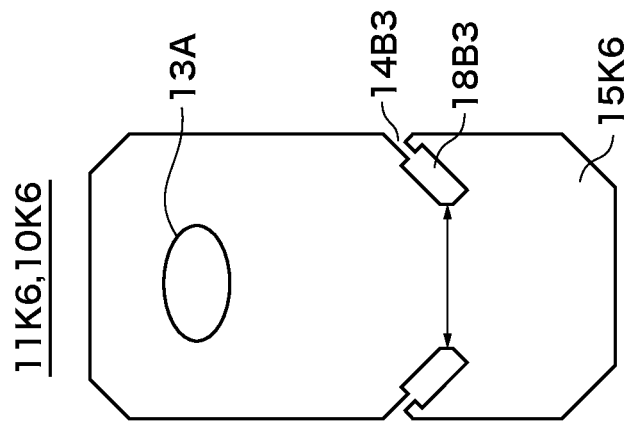
FIG. 10A is a drawing illustrating first example of rope fixtures of bag opening binding tools in Embodiment 5.
Figure 10B:
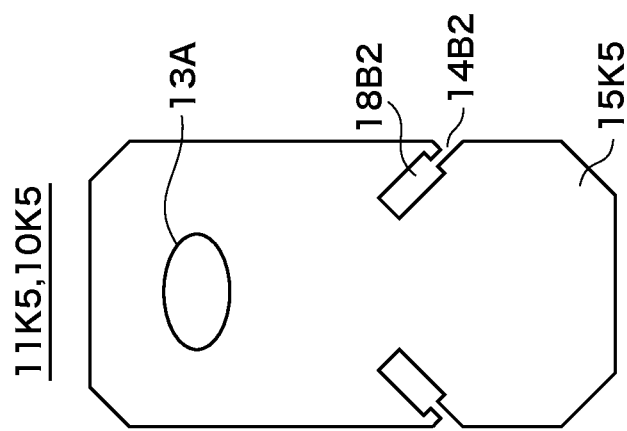
FIG. 10B is a drawing illustrating second example of rope fixtures of bag opening binding tools in Embodiment 5.
Figure 10C:
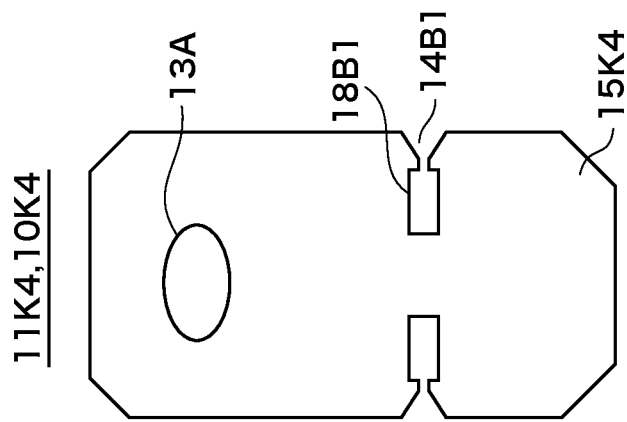
FIG. 10C is a drawing illustrating third example of rope fixtures of bag opening binding tools in Embodiment 5.

Examples of rope fixtures 11K4 to 11K6 of bag opening binding tools 10K4 to 10K6 in Embodiment 5 are illustrated in FIG. 10A to FIG. 10C. Description that duplicates that of Embodiment 4 will be omitted and different points will mainly be described. Although the number of the circular through-holes 13 is two in Embodiment 5, one elliptical (may be oval) through-hole 13A is provided in the present embodiment. The two tip portions of the closing rope 12 are gathered and passed through one through-hole 13A. Since the minor axis of the elliptical shape is slightly greater than or equal to the diameter of the closing rope 12, if the closing rope 12 is pulled or pushed in, the closing rope can pass through the locking portions 18B1 to 18B3, and during locking, the locking portions 18B1 to 18B3 lock the closing rope 12 with a frictional force.

In the present embodiment, an example in which the slits 14B1 to 14B3 are provided in a direction perpendicular to long sides of the plate-shaped body 15K4 is illustrated in FIG. 10A, an example in which the slits are provided in directions inclined at 45 degrees toward the through-hole 13A from the perpendicular direction is illustrated in FIG. 10B, and an example in which the slits are provided in directions inclined at 45 degrees toward sides opposite to the through-hole 13A from the perpendicular direction is illustrated in FIG. 10C.

The comparison with a case where the rope locking portions 14 are elliptical and a case where the rope locking portions 14B1 to 14B3 are rectangular are as described in Embodiment 4.

The other configurations of the rope fixture 11K4 to 11K6 and the other configurations of the closing rope 12 are the same as those of Embodiment 4, and the bag opening binding method of FIG. 5 can also be applied to the present embodiment. The same effects as those of Embodiment 4 are exhibited.

Sixth Embodiment

Figure 11A:
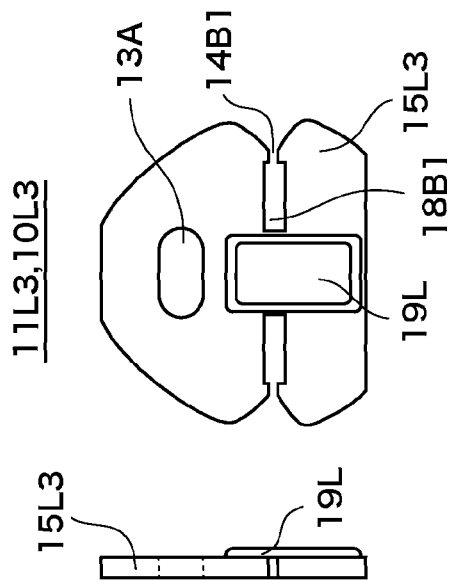
FIG. 11A is a drawing illustrating first example of rope fixtures of bag opening binding tools in Embodiment 6.
Figure 11B:
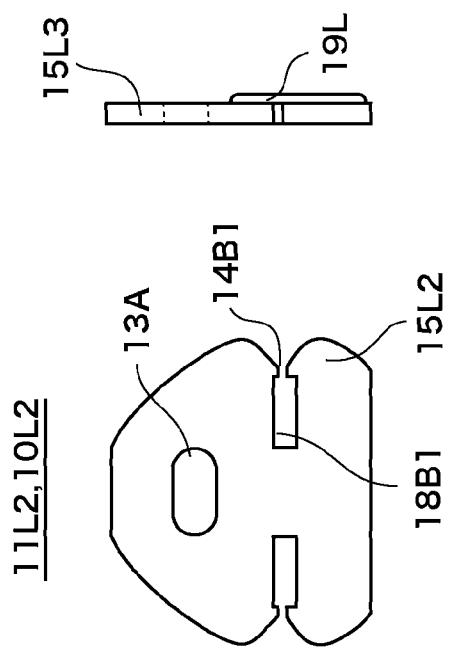
FIG. 11B is a drawing illustrating second example of rope fixtures of bag opening binding tools in Embodiment 6.
Figure 11C:
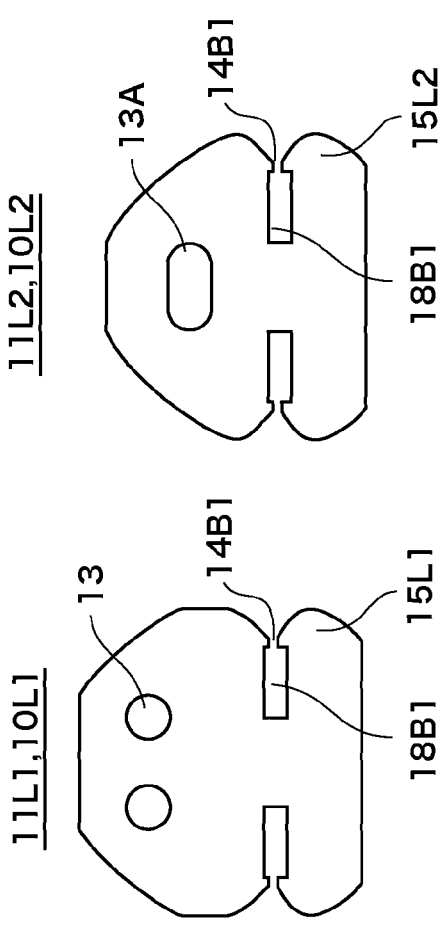
FIG. 11C is a drawing illustrating third example of rope fixtures of bag opening binding tools in Embodiment 6.
Figure 12A:
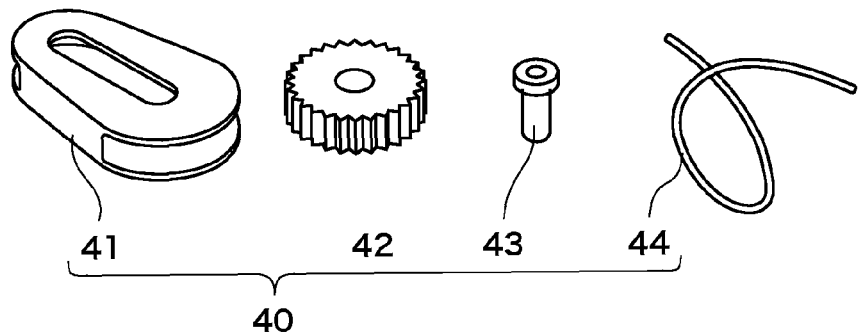
FIG. 12A is a first drawing illustrating an example of a rope fixture of a conventional bag opening binding tool.
Figure 12B:
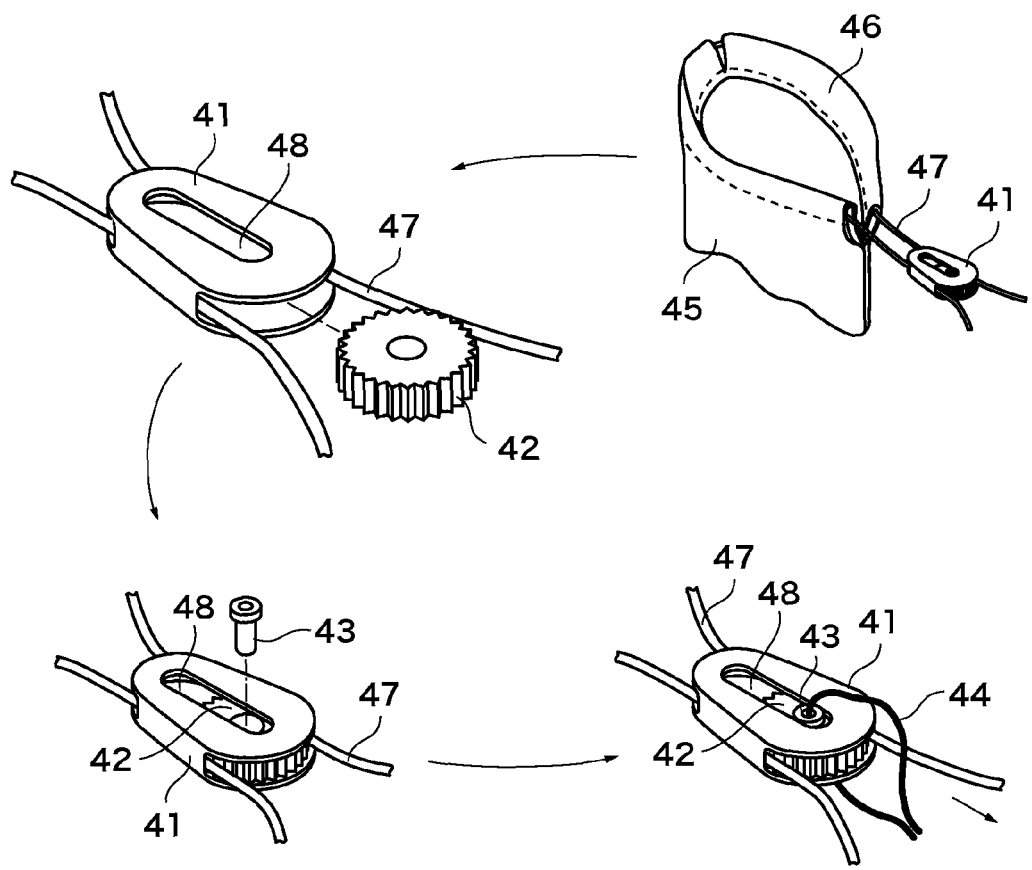
FIG. 12B is a second drawing illustrating an example of a rope fixture of a conventional bag opening binding tool.
Figure 13A:
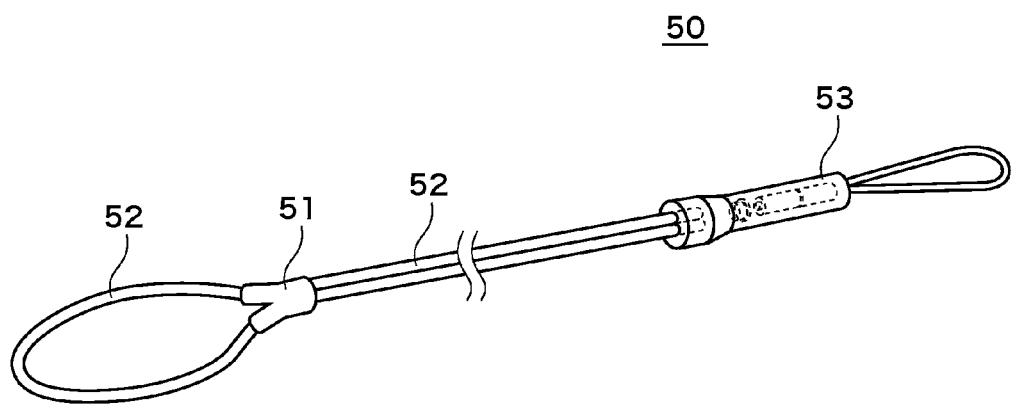
FIG. 13A is a first drawing illustrating another example of the rope fixture of the conventional bag opening binding tool.
Figure 13B:
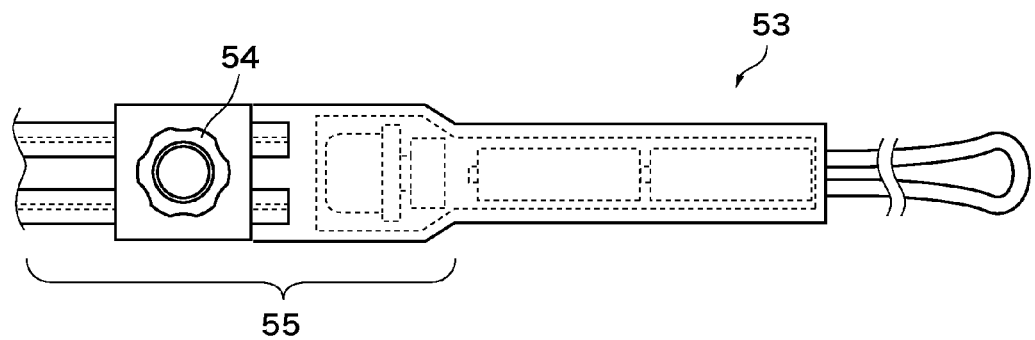
FIG. 13B is a second drawing illustrating another example of the rope fixture of the conventional bag opening binding tool.

Examples of rope fixtures 11L1 to 11L3 of bag opening binding tools 10L1 to 10L3 in Embodiment 6 are illustrated in FIG. 11A to FIG. 11C. Description that duplicates that of Embodiments 4 and 5 will be omitted and different points will mainly be described. FIG. 11A illustrates an example in which FIG. 9A of Embodiment 4 is modified. That is, FIG. 11A illustrates an example in which an aspect ratio (long side/short side) of a plate-shaped body 15L1 is made small, the ratio of the spacing between the two through-holes 13 to short sides of the plate-shaped body 15L1 is made small, and upper left and right cutouts of the plate-shaped body 15L1 are made large, and lower left and right cutouts are made small. FIG. 11B illustrates an example in which FIG. 10A of Embodiment 5 is modified similar to FIG. 11A. FIG. 11C illustrates an example in which a thickness increasing portion 19L is further provided between the two locking portions 18B1 in FIG. 11B. Since the aspect ratio is small in any case, the plate-shaped bodies are formed in a compact manner, and a flexing force in the longitudinal direction is not easily generated.

The other configurations of the rope fixture 11L1 to 11L3 and the other configurations of the closing rope 12 are the same as those of FIG. 9A of Embodiment 4 and those of FIG. 10A of Embodiment 5, and the bag opening binding method of FIG. 5 can also be applied to the present embodiment. The same effects as [Effects] described in Embodiment 1 are exhibited, similar to Embodiment 4 or Embodiment 5.

Although the present embodiment has been described above, it is apparent that the invention is not limited to the above embodiment, and various changes can be added without departing from the concept of the invention.

For example, although an example in which the flexible container bag is mainly cylindrical has been described in the above embodiments, the flexible container bag may have a rectangular pillar shape or a polygonal pillar shape. Additionally, the charging opening and the discharge opening may be same. Additionally, the cross type or the running type may be used. Although an example of the plate-shaped body in which the oblong shape is modified is illustrated regarding the rope fixture, a plate-shaped body in which an elliptical shape (may be an oval shape) or a polygonal shape is modified may be adopted. In Embodiment 1, an example in which the depressions are provided in portions of the plate-shaped body is illustrated. However, convex projections or convex depressions may be provided in suitable places of lateral sides, for example, at any of an upper side, a lower side, a left side, and a right side within a plate surface, or the lateral sides may be linear without providing either of the convex projections or the convex depressions. Additionally, the plate-shaped body may not be uniform and may be irregular in a thickness direction. For example, the plate-shaped body may be thickened for reinforcement of the surroundings of the through-holes or the slits. Additionally, the dimensions of the plate-shaped body can also be appropriately changed. Additionally, the slits may not be linear and may be made in the shape of a curve. Additionally, the insertion openings of the slits may be provided at short sides of the plate-shaped body. Additionally the groove for a hinge may be made in the long side direction of the plate-shaped body. Additionally, the number of the through-holes and the number of the slits may be three or more, and the positional relationship and dimensions of the through-holes and the slits can also be appropriately changed. Additionally, the diameter and material of the closing rope can also be appropriately selected. Additionally, the shape of the through-holes and the shape of the locking portions of the slits can also be appropriately selected to be a circular shape, an elliptical shape, an oval shape, a triangular shape, a rectangular shape, and a polygonal shape. Additionally, the method for winding the closing rope around the rope fixture can also be arbitrarily selected if an aspect in which the closing rope is wound so that the position of the closing rope is not shifted is provided. Additionally, the binding of the bag body is possible even if the winding process of the closing rope is omitted.

INDUSTRIAL APPLICABILITY

The invention is used for the binding of the bag openings of the bag body.

Use of the terms "a," "an," "the" and similar referents used in the context in explanation of the invention (particularly in the context of claims as described below) is to be construed to cover both the singular form and the plural form, unless otherwise indicated herein or clearly contradicted by context. The terms "comprising," "having," "including" and "containing" are to be construed as open-ended terms (more specifically, meaning "including, but not limited to") unless otherwise noted. Recitation of ranges of values herein are merely intended to serve as a shorthand method of referring individually to each separate value falling within the range, unless otherwise indicated herein, and each separate value is incorporated herein as if it were individually recited herein. All methods described herein can be performed in any suitable order unless otherwise indicated herein or otherwise clearly contradicted by context. The use of any and all examples, or exemplary language ("such as") provided herein, is intended merely to better illuminate the invention and does not pose a limitation on the scope of the invention unless otherwise claimed. No language herein should be construed as indicating any non-claimed element as essential to the practice of the invention.

Preferred embodiments of the invention are described herein, including the best mode known to the present inventors for carrying out the present invention. Variations of the preferred embodiments may become apparent to those skilled in the art upon reading the foregoing description. The present inventors expect skilled artisans to employ such variations as appropriate, and the present inventors intend for the invention to be practiced otherwise than as specifically described herein. Accordingly, the invention includes all modifications and equivalents of the subject matter recited in the claims appended hereto as permitted by applicable law. Moreover, any combination of the elements in all possible variations thereof is encompassed by the invention unless otherwise indicated herein or otherwise clearly contradicted by context.

DESCRIPTION OF REFERENCE NUMERALS AND SYMBOLS 10, 10E, 10K1-10K6, 10L1-10L3: bag opening binding tool
11, 11E, 11K1-11K6, 11L1-11L3: rope fixture
12: closing rope
13, 13A: through-hole
14, 14B1-14B3: slit
15, 15E, 15K1-15K6, 15L1-15L3: plate-shaped body
15A: first plate-shaped portion
15B: second plate-shaped portion
16: groove for hinge
17: insertion opening
18, 18B1 to 18B3: rope locking portion
19A: concave depression
19L: thicker part of plate-shaped body
20A, 20C: flexible container bag
21A, 21C: side surface
22A, 22C: upper surface
23A, 23C: lower surface
24A: hanging rope
24C: hanging belt
25A: filling hook
26A, 26B, 26C, 26D: reinforcing fabric
27A, 27C: hanging belt (part attached to side of a bag body)
28A, 28C: hanging belt (part attached to bottom of a bag body)
29C: charging opening
29D: discharge opening
31A: upper joining portion
31B: lower joining portion
31C: trunk joining portion
31D: hanging portion joining portion
32A: charging opening hook
33A, 33C: charging opening binding string
33B, 33D: discharge opening binding string
34B: lower rope
35A: charging opening
35B: discharge opening
36A: upper lid holder
36B: lower lid holder
37A: upper lid holder rope (closing rope)
37B: lower lid holder rope (closing rope)
38A: circular upper lid
38B: circular lower lid
39: tube (rope slider)
40: Highland lock
41: main body
42: toothed stopper
43: hollow shaft
44: release string
45: drawstring bag
46: string passing-through hole
47: wire net braid
48: slit
50: pet pulling leash
51: Y-shaped fastener
52: lead
53: handle portion
54: knob
55: rope pressing supporter

What is claimed is:

1. A rope fixture that fixes a closing rope for binding a bag opening of a flexible container bag as a bag body, comprising:
a plate-shaped body in which one through-hole and two slits are formed;
wherein the one through-hole is configured for allowing the closing rope to pass therethrough and the one through-hole is configured for locking the closing rope, and
each of the two slits is configured for nipping and locking the closing rope and each has an insertion opening provided at a lateral side of the plate-shaped body and each has a rope locking portion configured for allowing the closing rope to pass therethrough and lock the closing rope,
wherein dimensions of the rope locking portion are configured so that the closing rope can be locked, and
the one through-hole is configured for passing two tip portions of the closing rope, and
the insertion openings of the two slits are respectively provided at two opposed lateral sides of the plate-shaped body, and further comprising:
a linear groove formed at a position on a surface of the plate-shaped body where the linear groove does not overlap with the one through-hole and the slit, wherein the linear groove forms a hinge axis for allowing the plate-shaped body to bend.

2. The rope fixture according to claim 1;
wherein the material of the rope fixture is plastic or metal.

3. The rope fixture according to claim 1;
wherein the plate-shaped body is a circular shape, an elliptical shape, a triangular shape, a quadrangular shape, a polygonal shape having corners equal to or more than a pentagonal shape.

4. A bag opening binding tool comprising:
the rope fixture according to claim 1; and
the closing rope.

5. A flexible container bag comprising:
the bag opening binding tool according to claim 4; and
the bag body that receives contents.

6. The rope fixture according to claim 1;
wherein the plate-shaped body is of a quadrangular shape and a distance between the one through-hole and any slit in a long side direction of the plate-shaped body is more than predetermined value.

7. The rope fixture according to claim 6;
wherein the predetermined value is twice a diameter of the closing rope.

8. A rope fixture that fixes a closing rope for binding a bag opening of a flexible container bag as a bag body, comprising:
   a plate-shaped body in which two through-holes and two slits are formed;
   wherein the two through-holes are configured for allowing the closing rope to pass therethrough and the two through-holes are configured for locking the closing rope, and
   each of the two slits is configured for nipping and locking the closing rope and each has an insertion opening provided at a respective lateral side of the plate-shaped body and each has a rope locking portion configured for allowing the closing rope to pass therethrough and lock the closing rope,
   wherein dimensions of the rope locking portion are configured so that the closing rope can be locked,
   the two through-holes are configured for allowing the closing rope to pass therethrough and for locking the closing rope, each of the two through-holes is configured for passing each tip portion of the closing rope, and
   the insertion openings of the two slits are respectively provided at two opposed lateral sides of the plate-shaped body, and further comprising:
      a linear groove formed at a position on a surface of the plate-shaped body where the linear groove does not overlap with the two through-holes and the slit, wherein the linear groove forms a hinge axis for allowing the plate-shaped body to bend.

9. The rope fixture according to claim 8;
wherein the material of the rope fixture is plastic or metal.

10. The rope fixture according to claim 8;
wherein the plate-shaped body is a circular shape, an elliptical shape, a triangular shape, a quadrangular shape, a polygonal shape having corners equal to or more than a pentagonal shape.

11. A bag opening binding tool comprising:
the rope fixture according to claim 8; and
the closing rope.

12. A flexible container bag comprising:
the bag opening binding tool according to claim 11; and
the bag body that receives contents.

13. The rope fixture according to claim 8;
wherein the plate-shaped body is of a quadrangular shape and a distance between any of the two through-holes and any slit in a long side direction of the plate-shaped body is more than predetermined value.

14. The rope fixture according to claim 13;
wherein the predetermined value is twice a diameter of the closing rope.

* * * * *